(12) United States Patent
Browder et al.

(10) Patent No.: US 12,494,295 B1
(45) Date of Patent: Dec. 9, 2025

(54) APPARATUS AND METHOD FOR AN INTERACTIVE COURSE USER INTERFACE INCLUDING A DIGITAL AVATAR

(71) Applicant: Signet Health Corporation, North Richland Hills, TX (US)

(72) Inventors: Blake Browder, Dallas, TX (US); Joy Figarsky, Little Rock, AR (US)

(73) Assignee: Behavioral Health Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,821

(22) Filed: Nov. 24, 2024

(51) Int. Cl.
 *G16H 70/20* (2018.01)
 *G06T 13/40* (2011.01)
 *G09B 23/28* (2006.01)
 *G16H 40/20* (2018.01)

(52) U.S. Cl.
 CPC .............. *G16H 70/20* (2018.01); *G06T 13/40* (2013.01); *G09B 23/28* (2013.01); *G16H 40/20* (2018.01)

(58) Field of Classification Search
 None
 See application file for complete search history.

(56) References Cited

U.S. PATENT DOCUMENTS

| | | | |
|---|---|---|---|
| 2010/0299155 A1* | 11/2010 | Findlay | G16H 20/10 705/2 |
| 2016/0314269 A1 | 10/2016 | Manley | |
| 2019/0074081 A1 | 3/2019 | Easton et al. | |
| 2020/0013499 A1* | 1/2020 | Yardley | G06Q 30/04 |
| 2022/0070385 A1* | 3/2022 | Van Os | H04N 23/62 |
| 2022/0399113 A1* | 12/2022 | Dohrmann | G16H 40/67 |
| 2023/0172536 A1* | 6/2023 | Hashkes | G16H 50/50 600/595 |
| 2023/0395220 A1* | 12/2023 | Vallery | G06T 13/40 |
| 2024/0028106 A1* | 1/2024 | Elor | G06T 19/006 |
| 2024/0161373 A1 | 5/2024 | Ray et al. | |
| 2024/0185001 A1* | 6/2024 | Nagaraju | G06F 40/284 |
| 2024/0296753 A1* | 9/2024 | Gogin | G06T 13/40 |
| 2024/0404702 A1* | 12/2024 | Bell | G16H 15/00 |

FOREIGN PATENT DOCUMENTS

| | | | | |
|---|---|---|---|---|
| KR | 102429630 B1 | 8/2022 | | |
| KR | 20230163140 A | 11/2023 | | |
| WO | WO-2024194863 A1 * | 9/2024 | | G16H 10/20 |

* cited by examiner

*Primary Examiner* — Hilina K Demeter
(74) *Attorney, Agent, or Firm* — Caldwell Intellectual Property Law

(57) ABSTRACT

An apparatus and method for an interactive course user interface including a digital avatar are disclosed. The apparatus includes at least a processor and a memory communicatively connected to the at least a processor, wherein the memory contains instructions configuring the at least a processor to using a display, configure a user interface to display instructional content to a user, using the user interface, receive a prompt from the user, using a large language model (LLM), generate a natural language response based on the prompt and the instructional content, determine a digital avatar pose demonstration datum as a function of the natural language response and the instructional content and using the display, update the user interface, wherein updating the user interface includes generating a digital avatar display element configured to display the digital avatar pose demonstration datum to the user and communicating the natural language response to the user.

18 Claims, 9 Drawing Sheets

US 12,494,295 B1

APPARATUS AND METHOD FOR AN INTERACTIVE COURSE USER INTERFACE INCLUDING A DIGITAL AVATAR

FIELD OF THE INVENTION

The present invention generally relates to the field of user interface. In particular, the present invention is directed to an apparatus and method for an interactive course user interface including a digital avatar.

BACKGROUND

In recent years, digital avatars have become increasingly prevalent across various sectors. A digital avatar is a virtual representation of a person or character, often rendered in two- or three-dimensional form, which can replicate human-like movements, expressions, and interactions. These avatars serve as intermediaries between digital systems and users. Despite the advancements in digital avatar, challenges remain in making digital avatars adaptive.

SUMMARY OF THE DISCLOSURE

In an aspect, an apparatus for an interactive course user interface including a digital avatar is disclosed. The apparatus includes at least a processor and a memory communicatively connected to the at least a processor, wherein the memory contains instructions configuring the at least a processor to using a display, configure a user interface to display instructional content to a user, using the user interface, receive a prompt from the user, using a large language model (LLM), generate a natural language response based on the prompt and the instructional content, determine a digital avatar pose demonstration datum as a function of the natural language response and the instructional content, wherein the digital avatar pose demonstration datum includes a plurality of vertices of the digital avatar and key frame data, wherein the key frame data comprises vertex position data and using the display, update the user interface, wherein updating the user interface includes generating a digital avatar display element configured to display the digital avatar pose demonstration datum to the user and communicating the natural language response to the user.

In another aspect, a method for an interactive course user interface including a digital avatar is disclosed. The method includes configuring, using at least a processor, a user interface to display instructional content to a user using a display, receiving, using the at least a processor, a prompt from the user using the user interface, generating, using the at least a processor, a natural language response based on the prompt and the instructional content using a large language model (LLM), determining, using the at least a processor, a digital avatar pose demonstration datum as a function of the natural language response and the instructional content, wherein the digital avatar pose demonstration datum includes a plurality of vertices of the digital avatar and key frame data, wherein the key frame data comprises vertex position data and updating, using the at least a processor, the user interface using the display, wherein updating the user interface includes generating a digital avatar display element configured to display the digital avatar pose demonstration datum to the user and communicating the natural language response to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
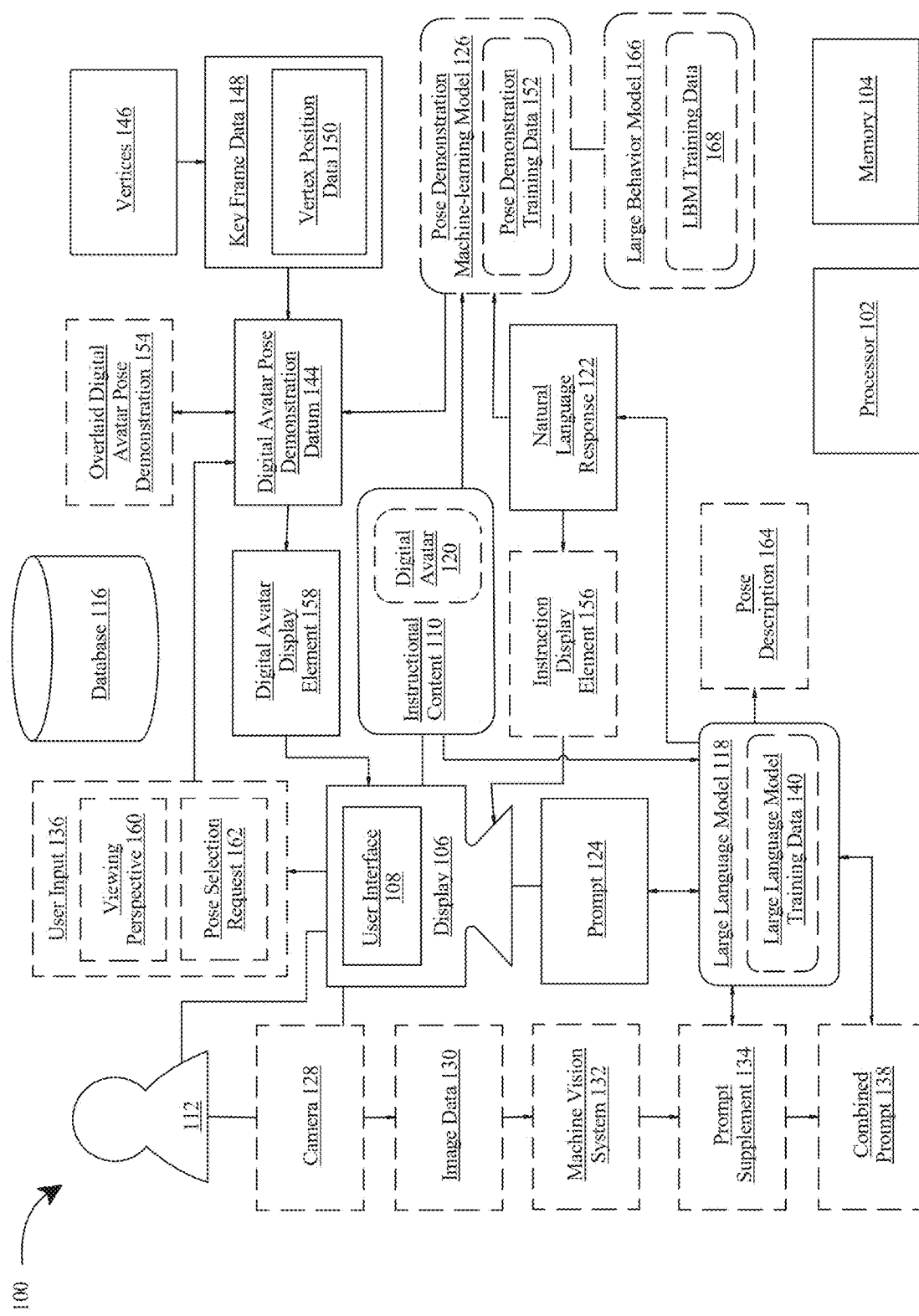
FIG. 1 illustrates a block diagram of an exemplary apparatus for an interactive course user interface including a digital avatar.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for an interactive course user interface including a digital avatar are disclosed. The apparatus includes at least a processor and a memory communicatively connected to the at least a processor, wherein the memory contains instructions configuring the at least a processor to using a display, configure a user interface to display instructional content to a user, using the user interface, receive a prompt from the user, using a large language model (LLM), generate a natural language response based on the prompt and the instructional content, determine a digital avatar pose demonstration datum as a function of the natural language response and the instructional content, wherein the digital avatar pose demonstration datum includes a plurality of vertices of the digital avatar and key frame data, wherein the key frame data comprises vertex position data and using the display, update the user interface, wherein updating the user interface includes generating a digital avatar display element configured to display the digital avatar pose demonstration datum to the user and communicating the natural language response to the user.

Exemplary embodiments illustrating aspects of the present disclosure are described below in the context of several specific examples Referring now to FIG. 1, an exemplary embodiment of an apparatus 100 for an interactive course user interface including a digital avatar is illustrated. Apparatus 100 may include a computing device. Apparatus 100 includes a processor 102. Processor 102 may include, without limitation, any processor described in this disclosure. Processor 102 may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, in some embodiments, apparatus 100 includes at least a processor 102 and a memory 104 communicatively connected to the at least a processor 102, the memory 104 containing instructions configuring the at least a processor 102 to perform one or more processes described herein. Processor 102 may be configured to perform one or more processes described herein.

Still referring to FIG. 1, processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented, as a non-limiting example, using a "shared nothing" architecture.

Still referring to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, memory 104 contains instructions configuring processor 102 to using a display 106, configure a user interface 108 to display instructional content 110 to a user 112. The display 106 disclosed herein is further described below. In some embodiments, apparatus 100 may include user interface 108. User interface 108 may be a component of display 106. Display 106 may include, in non-limiting examples, a smartphone, smartwatch, laptop computer, desktop computer, virtual reality device, or tablet. In some embodiments, display 106 may include an interface configured to receive inputs from user 112. In some embodiments, user 112 may manually input any data into apparatus 100 using display 106. In some embodiments, user 112 may have a capability to process, store or transmit any information independently. As used herein, a "user interface" is a mechanism by which a user may input information into a computing device, a mechanism by which a computing device may output information to a user, or both. User interface 108 may include an input interface and/or an output interface. An input interface may include one or more mechanisms for a computing device to receive data from a user 112 such as, in non-limiting examples, a mouse, keyboard, button, scroll wheel, camera, microphone, switch, lever, touchscreen, trackpad, joystick, and controller. An output interface may include one or more mechanisms for a computing device to output data to a user 112 such as, in non-limiting examples, a screen, speaker, and haptic feedback system. An output interface may be used to display one or more elements of data described herein. A device may display a datum if the device outputs the datum in a format suitable for communication to a user. For example, a device may display a datum by outputting text or an image on a screen or outputting a sound using a speaker. A user interface 108 may include a graphical user interface (GUI), command line interface (CLI), menu-driven user interface, touch user interface, voice user interface (VUI), form-based user interface, any combination thereof and the like. In some embodiments, user interface 108 may operate on and/or be communicatively connected to a decentralized platform, metaverse, and/or a decentralized exchange platform associated with the user 112. For example, a user 112 may interact with user interface 108 in virtual reality. In some embodiments, a user 112 may interact with the use interface using a computing device distinct from and communicatively connected to at least a processor 102. For example, a smart phone, smart, tablet, or laptop operated by a user 112. In an embodiment, user interface 108 may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users 112 to select one from them. A menu bar may be displayed horizontally across the screen such as pull-down menu. When any option is clicked in this menu, then the pull-down menu may appear. A menu may include a context menu that appears only when the user 112 performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

Still referring to FIG. 1, an "instructional content," as described in this disclosure, is information educating medical professionals about particular medical or health guidelines. For example, and without limitation, instructional content 110 may include treatment options for a particular medical illness, dosing options for a particular illness, instructions on how to treat patients, handling belligerent patients, and/or the like. In one or more embodiments, each instructional content 110 may educate a user 112, such as a medical professional, on various rules and procedures associated with a particular medical illness. As a non-limiting example, instructional content 110 may include an image or video of a health care staff performing a physical technique. In one or more embodiments, each instructional content 110 may be associated with one or more guidelines. A "guideline" for the purposes of this disclosure refers to a particular rule or regulation set out by a governing body. For example, and without limitation, guideline may include a particular dosing as recommended by the FDA or the American Heart Association. In one or more embodiments each guideline may indicate a particular rule or set of instructions in association with a particular medical illness. For example, and without limitation, one guideline may include rules or regulations for individuals with diabetes, while another may include rules or regulations for individuals with heart disease. In an embodiment, instructional contents 110 may include guidelines that are presented to medical professionals in an educational format. In one or more embodiments, each instructional content 110 may include guidelines for a medical illness. In one or more embodiments, each instructional content 110 may include a separate guideline.

Still referring to FIG. 1, instructional contents 110 may be stored on database 116 and retrieved from database 116. In one or more embodiments, identifying instructional contents 110 may include retrieving instructional contents 110 from database 116. In one or more embodiment, instructional contents 110 may be initially created by a user 112, $3^{rd}$ party, large language model 118 as described in further detail below, and/or the like. As used in this disclosure, "database" is a data structure configured to store data associated with instructional contents. In one or more embodiments, database 116 may include inputted or calculated information and datum related to instructional content 110. In some embodiments, a datum history may be stored in database 116. As a non-limiting example, the datum history may include real-time and/or previous inputted data related to instructional content 110. As a non-limiting example, database 116 may include instructions from a user, who may be an expert user, a past user in embodiments disclosed herein, or the like, where the instructions may include examples of the data related to instructional content 110.

Still referring to FIG. 1, in some embodiments, processor 102 may be communicatively connected with database 116. For example, and without limitation, in some cases, database 116 may be local to processor 102. In another example, and without limitation, database 116 may be remote to processor 102 and communicative with processor 102 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 102 connect directly, dynamically, and non-hierarchically to as many other computing devices as possible. A "network topology" as used in this disclosure is an arrangement of elements of a communication network. The network may use an immutable sequential listing to securely store database 116. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Still referring to FIG. 1, in some embodiments, database 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, processor 102 may receive instructional contents 110 using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 102 may generate web crawler to scrape instructional content 110 from website. The web crawler may be seeded and/or trained with a reputable website to begin the search. Web crawler may be generated by processor XX. In some embodiments, web crawler may be trained with information received from user 112 through a user interface. In some embodiments, web crawler may be configured to generate a web query. A web query may include search criteria received from user 112. For example, user 112 may submit a plurality of websites for web crawler to search to instructional content 110. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor XX, received from a machine learning model, and/or received from user 112. In some embodiments, a relevancy score may include a range of numerical values that may correspond to a relevancy strength of data received from a web crawler function. As a non-limiting example, a web crawler function may search the Internet for instructional content 110. In some embodiments, a web crawler may work in tandem with a program designed to interpret information retrieved using a web crawler.

Still referring to FIG. 1, instructional contents 110 and/or apparatus 100 may include a digital avatar 120. A "digital avatar," as used in this disclosure, is an interactive character or entity in a virtual environment. In a non-limiting example, digital avatar 120 may include a virtual representation of an individual in a virtual environment. In an embodiment, a digital avatar 120 may be customizable. Digital avatar 120 may include, without limitation, an animal, human, robot, inanimate object, and the like, and may include one or more personalized characteristics, wherein personalized characteristics may be programmed by an individual tasked with apparatus 100. In a non-limiting example, virtual environment may include an extended reality space, such as, without limitation, augmented reality (AR) space, virtual reality (VR) space, and/or any other digital realities. For example, and without limitation, extended reality space may include a virtual classroom, virtual meeting room, virtual study room, and the like thereof. In one or more embodiments, digital avatar 120 may include a virtual representation of a living being and/or inanimate object capable of conveying speech. In one or more embodiments, digital avatar 120 may convey information within instructional content 110 to a medical professional. In one or more embodiments, digital avatar 120 may be configured to convey information within instructional contents 110 in the form of speech. In one or more embodiments, digital avatars 120 may mimic teachers and/or other educational professional and convey over guidelines to users 112. In one or more embodiments, digital avatar 120 may include prewritten instructions to convey any information within instructional content 110. In one or more embodiments, digital avatar 120 may include one or more text to speech algorithms in order to convey textual data within instructional contents 110 in a vocal format. In one or more embodiments digital avatar 120 may be programmed by a user 112 to receive any new information or changes in information within instructional content 110 and convey the information in a vocal or virtual format. In one or more embodiments, digital avatar 120 may be programmed to interact with a user 112 (e.g., a medical professional seeking educational content) of system and convey over information within instructional contents 110. In one or more embodiments, digital avatar 120 may include a chatbot system as described in reference to at least FIG. 6. In one or more embodiments, digital avatar 120 and/or chatbot system may be communicatively connected to a large language model 118, wherein the digital avatar 120 may be configured to receive questions or follow up questions from the user and utilize the large language model 118 to generate natural language response 122. For example, and without limitation, a user 112 may respond with "can you define this word or explain it more simply" wherein digital avatar 120 may transmit the interaction to LLM 118, receive an output from the LLM 118 and convey the output to the user 112 through the digital avatar 120. In one or more embodiments, apparatus 100 may include digital avatar 120 wherein instructional contents 110 are conveyed and/or output through digital avatar 120.

Still referring to FIG. 1, in some embodiments, instructional contents 110 may include one or more interactive elements. An "interactive element" for the purposes of this disclosure is an element within a graphical user interface that allows for interaction with system by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on a graphical user interface, wherein the selection of a particular push button may result in a particular function. In one or more embodiments, interactive elements may include words, phrases, illustrations and the like to indicate the particular process the user 112 would like system to perform. In one or more embodiments, instructional contents 110 may include questions and answers, wherein questions may be presented through a graphical user interface, and a user 112 may utilize interactive element to answer the questions. In one or more embodiments, instructional content 110 may include tests and/or questions presented to a user following the conveyance of information in order to test user 112 on the information that was received. In one or more embodiments, interactive elements may allow for users 112 to select or input answers to questions received. In one or more embodiments, each question may be associated with a particular guidelines wherein answers to the wrong questions may prompt processor 102 to re-convey the particular guideline to user 112.

Still referring now to FIG. 1, additionally, instructional content 110 disclosed herein may be consistent with a course module in U.S. Nonprovisional patent application Ser. No. 18/957,639, filed on Nov. 22, 2024, and titled "SYSTEMS AND METHODS FOR DYNAMICALLY UPDATING DATA FOR COURSE GENERATION," the entirety of which is incorporated as a reference. Additionally, instructional content 110 disclosed herein may be consistent with a course module in U.S. Nonprovisional patent application Ser. No. 18/957,676, filed on Nov. 23, 2024, and titled "SYSTEM AND METHOD FOR GENERATING A NAMESPACE BASED ON A USER PROFILE," the entirety of which is incorporated as a reference.

Still referring to FIG. 1, in some embodiments, prompt 124 may be converted into a different form. Data formats may be converted in a variety of ways, such as without limitation, using a speech to text function or using optical character recognition. In some embodiments, prompt 124 may be converted into a different form such that it is in a form appropriate for input into a function. As a non-limiting example, a large language model 118, pose demonstration machine-learning model 126, and any machine-learning models described in this disclosure may only accept inputs in a particular format, and prompt 124 may be converted into that format such that it may be effectively input into large language model 118, pose demonstration machine-learning model 126, and any machine-learning models.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word.

Still referring to FIG. 1, in some embodiments, apparatus 100 includes camera 128. Apparatus 100 may, using camera 128, capture image data 130 of a user 112 or patient. Image data 130 may include a digital image. As used herein, a "camera" is a set of one or more devices configured to detect electromagnetic radiation. Camera 128 may detect, in non-limiting examples, visible light, infrared light, and ultraviolet light. Camera 128 may generate a representation of detected electromagnetic radiation, such as an image. In some cases, a camera may include one or more optics. Non-limiting examples of optics include spherical lenses, aspherical lenses, reflectors, polarizers, filters, windows, aperture stops, and the like. In some cases, camera 128 may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data 130 may be generated by camera 128. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. In a non-limiting example, image data 130 may include an image or video of a health care staff performing a physical technique. In another non-limiting example, image data 130 may include an image or video of a patient in violent acts. Alternatively, an image may be comprised of any media capable of representing a physical scene, space, and/or object. Alternatively, where "image" is used as a verb, in this disclosure, it refers to generation and/or formation of an image. In some embodiments, camera 128 may be configured to capture video.

Still referring to FIG. 1, in some embodiments, apparatus 100 may include a machine vision system 132. For the purposes of this disclosure, a "machine vision system" is a type of technology that enables a computing device to inspect, evaluate and identify still or moving images. In some embodiments, a machine vision system 132 may include at least a camera 128. For example, in some cases, a machine vision system 132 may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system 132 may use a classifier, such as any classifier described throughout this disclosure.

Still referring to FIG. 1, an exemplary machine vision camera is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, a machine vision system 132 may use images, such as images (image data 130) from at least a camera 128, to make a determination about a scene, space, and/or object or generate a prompt supplement 134. For the purposes of this disclosure, a "prompt supplement" is an assessment of a user that indirectly inferred from the user's behavior, actions, or interactions. As a non-limiting example, prompt supplement 134 may include an assessment of a user's behavior to instructional content 110 such as but not limited to reactions, facial expression, pose, and the like. As another non-limiting example, prompt supplement 134 may include an assessment of a user's behavior to instructional content 110 such as but not limited to clicks, views, dwell time, browsing histories, frequencies of actions, interactions with contents, or the like. In some embodiments, processor 102 may be configured to analyze image data 130 or user input 136 to generate prompt supplement 134. As a non-limiting example, processor 102 may analyze image data 130 to determine user's pose or expression. As another non-limiting example, processor 102 may analyze user input 136 to determine data patterns, trends, or anomalies using statistical methods, data mining techniques, machine-learning algorithms, or the like. The user input 136 disclosed herein is further described below. In a non-limiting example, user may manually input a prompt supplement 134 by manipulating display 106. For example, and without limitation, user may input prompt supplement 134 and/or user input 136 through a chatbot using display 106. The chatbot disclosed herein is further described below. In some embodiments, prompt supplement 134 may be stored in database 116. In some embodiments, prompt supplement 134 may be retrieved from database 116.

Still referring to FIG. 1, apparatus 100 may include an image processing module. As used in this disclosure, an "image processing module" is a component of a device designed to process digital images. In an embodiment, image processing module may include a plurality of software algorithms that can analyze, manipulate, or otherwise enhance image data 130, such as, without limitation, a plurality of image processing techniques as described below. In another embodiment, image processing module may include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like.

Still referring to FIG. 1, image processing module may be configured to receive image data 130 from at least a camera 128. In a non-limiting example, image processing module may be configured to receive the image data 130 by generating a first image capture parameter, transmitting a command to at least an camera 128 to take at least a first image of the image data 130 with the first image capture parameter, generating a second image capture parameter, transmitting a command to at least an camera 128 to take at least a second image of the image data 130 with the second image capture parameter, and receiving, from at least an camera 128, at least a first image and at least second image. In another non-limiting example, image data 130 may be taken by at least a camera 128 using the same image capture parameter. Image capture parameter may be generated as a function of user input.

Still referring to FIG. 1, at least an image may be transmitted from at least a camera 128 to image processing module via any suitable electronic communication protocol, including without limitation packet-based protocols such as transfer control protocol-internet protocol (TCP-IP), file transfer protocol (FTP) or the like. In case of user device of image capturing device, image data 130 may be transmitted via a text messaging service such as simple message service (SMS) or the like. image data 130 may be received via a portable memory device such as a disc or "flash" drive, via local and/or near-field communication (NFC), or according to any other direct or indirect means for transmission and/or transfer of digital images. Receiving image data 130 may include retrieval of image data 130 from a data store containing image data 130 as described below; for instance, and without limitation, image data 130 may be retrieved using a query that, for instance, specifies a timestamp that one or more images may be required to match.

Still referring to FIG. 1, image processing module is configured to process image data 130. In an embodiment, image processing module may be configured to compress and/or encode image data 130 to reduce the file size and storage requirements while maintaining the essential visual information (e.g., visual information of user 112) need for further processing steps as described below. In an embodiment, compression and/or encoding of image data 130 may facilitate faster transmission of image data 130. In some cases, image processing module may be configured to perform a lossless compression on image data 130, wherein the lossless compression may maintain the original image quality of image data 130. In a non-limiting example, image processing module may utilize one or more lossless compression algorithms, such as, without limitation, Huffman coding, Lempel-Ziv-Welch (LZW), Run-Length Encoding (RLE), and/or the like to identify and remove redundancy in each image of image data 130 without losing any information. In such embodiment, compressing and/or encoding each image of image data 130 may include converting the file format of each image into PNG, GIF, lossless JPEG2000 or the like. In an embodiment, image data 130 compressed via lossless compression may be perfectly reconstructed to the original form (e.g., original image resolution, dimension, color representation, format, and the like) of image data 130. In other cases, image processing module may be configured to perform a lossy compression on image data 130, wherein the lossy compression may sacrifice some image quality of image data 130 to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within image data 130, resulting in a smaller file size but a slight loss of image quality of image data 130. In such embodiment, compressing and/or encoding each image of image data 130 may include converting the file format of each image into JPEG, WebP, lossy JPEG2000, or the like.

Still referring to FIG. 1, in an embodiment, processing image data 130 may include determining a degree of quality of depiction of user 112 for each image of image data 130. As used in this disclosure, a "degree of quality of depiction" of user 112 is the degree to which image clearly depicts a user 112. In an embodiment, image processing module may determine a degree of blurriness of each image of image data 130. In a non-limiting example, image processing module may perform a blur detection by taking a Fourier transform, or an approximation such as a Fast Fourier Transform (FFT) of each image of image data 130 and analyzing a distribution of low and high frequencies in the resulting frequency-domain depiction of each image of image data 130; for instance, and without limitation, numbers of high-frequency values below a threshold level may indicate blurriness. In another non-limiting example, detection of blurriness may be performed by convolving each image of image data 130, a channel of each image of image data 130, or the like with a Laplacian kernel; for instance, and without limitation, this may generate a numerical score reflecting a number of rapid changes in intensity shown in each image, such that a high score indicates clarity and a low score indicates blurriness. In some cases, blurriness detection may be performed using a Gradient-based operator, which measures operators based on the gradient or first derivative of each image of image data 130, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of image data 130. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of each image of image data 130 from its frequency content. Additionally, or alternatively, image processing module may be configured to rank image data 130 according to degree of quality of depiction of user 112 and select a highest-ranking image from image data 130.

Still referring to FIG. 1, processing image data 130 may include enhancing at least an image containing user 112 via a plurality of image processing techniques to improve the quality (or degree of quality of depiction) of at least an image for better processing and analysis as described further in this disclosure. In an embodiment, image processing module may be configured to perform a noise reduction operation on at least an image containing user 112, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done, by image processing module, by averaging or filtering out pixel values in neighborhood of each pixel of at least an image to reduce random variations.

Still referring to FIG. 1, in another embodiment, image processing module may be configured to perform a contrast enhancement operation on at least an image containing user 112. In some cases, at least an image may exhibit low contrast, making user 112 difficult to distinguish from the background. Contrast enhancement operation may improve the contrast of at least an image containing user 112 by stretching the intensity range of at least an image and/or redistributing the intensity values (i.e., degree of brightness or darkness of a pixel in at least an image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. image processing module may be configured to adjust the brightness and darkness levels within the at least an image to make user 112 more distinguishable (i.e., increase degree of quality of depiction). Additionally, or alternatively, image processing module may be configured to perform a brightness normalization operation to correct variations in lighting conditions (i.e., uneven brightness levels). In some cases, at least an image may include a consistent brightness level across the entire user 112 after brightness normalization operation performed by image processing module. In a non-limiting example, image processing module may perform a global or local mean normalization, where the average intensity value of the entire image or user 112 may be calculated and used to adjust the brightness levels.

Still referring to FIG. 1, in some embodiments, image processing module may be configured to perform a color space conversion operation to increase degree of quality of depiction. In a non-limiting example, in case of color image (i.e., RGB image), image processing module may be configured to convert RGB image to grayscale or HSV color space. Such conversion may emphasize the differences in intensity values between user 112 and the background. image processing module may further be configured to perform an image sharpening operation such as, without limitation, unsharp masking, Laplacian sharpening, high-pass filtering, and/or the like. image processing module may use image sharpening operation to enhance the edges and fine details related to user 112 within at least an image by emphasizing high-frequency components within at least an image.

Still referring to FIG. 1, processing image data 130 may include isolating user 112 from at least an image as a function of plurality of image processing techniques. At least an image may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of at least an image and used to determine an output pixel value for that location. In a non-limiting example, isolating user 112 from at least an image may include applying a dilation operation, wherein the dilation operation is a basic morphological operation configured to expand or grow the boundaries of objects in at least an image. In another non-limiting example, isolating user 112 from at least an image may include applying an erosion operation, wherein the erosion operation is a basic morphological operation configured to shrink or erode the boundaries of objects in at least an image. In another non-limiting example, isolating user 112 from at least an image may include applying an opening operation, wherein the opening operation is a basic morphological operation configured to remove small objects or thin structures from at least an image while preserving larger structures. In a further non-limiting example, isolating user 112 from at least an image may include applying a closing operation, wherein the closing operation is a basic morphological operation configured to fill in small gaps or holes in objects in at least an image while preserving the overall shape and size of the objects. These morphological operations may be performed by image processing module to enhance the edges of objects, remove noise, or fill gaps in user 112 before further processing.

Still referring to FIG. 1, in an embodiment, isolating user 112 from at least an image may include utilizing an edge detection technique, which may detect one or more shapes defined by edges. An "edge detection technique," as used in this disclosure, includes a mathematical method that identifies points in a digital image, such as, without limitation, at least an image, at which the image brightness changes sharply and/or has discontinuities. In an embodiment, such points may be organized into straight and/or curved line segments, which may be referred to as "edges." Edge detection technique may be performed, by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a position of a user 112; in an embodiment, edge detection technique may be used to find closed figures formed by edges.

Still referring to FIG. 1, in some embodiments, isolating user 112 from at least an image may include determining a region of interest (ROI) via edge detection technique. As used in this disclosure, a "region of interest" is a specific area within a digital image that contains information relevant to user 112. In a non-limiting example, image information located outside ROI may include irrelevant or extraneous information such as, without limitation, equipment, furniture, and the like. Such portion of image containing irrelevant or extraneous information may be disregarded, by image processing module. In some cases, ROI may vary in size, shape, and/or location within at least an image. In a non-limiting example ROI may be presented as a rectangular bounding box (length×width) around user 112 on at least an image. In some cases, ROI may specify one or more coordinates of one or more corners of rectangular bounding box, and/or length and/or width of rectangular bounding box around user 112 on at least an image. image processing module may then be configured to isolate user 112 from the at least an image based on ROI. In a non-limiting example, and without limitation, image processing module may crop at least an image according to rectangular bounding box around user 112.

Still referring to FIG. 1, image processing module may be configured to perform a connected component analysis (CCA) on at least an image for user 112 isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert at least an image into a binary image via a thresholding process, wherein the thresholding process may involve setting a threshold value that separates the pixels of at least an image corresponding to the user 112 (foreground) from those corresponding to the background. Pixels with intensity values above the threshold may be set to 1 (white) and those below the threshold may be set to 0 (black). In an embodiment, CCA may be employed to detect and extract user 112 by identifying a plurality of connected regions that exhibit specific properties or characteristics of user 112. image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of user 112 may be retained, by image processing module, while other components may be discarded.

Still referring to FIG. 1, in an embodiment, isolating user 112 from at least an image may include segmenting user 112 into a plurality of user 112 sub-regions. Segmenting user 112 into plurality of user 112 sub-regions may include segmenting user 112 as a function of ROI and/or CCA via an image segmentation process. As used in this disclosure, an "image segmentation process" is a process for partition a digital image, such as, without limitation, an image, into one or more segments, wherein each segment represents a distinct part of the image. Image segmentation process may change the representation of plurality of images. Image segmentation process may be performed, by image processing module, via one or more image segmentation techniques. In a non-limiting example, image processing module may perform a region-based segmentation, wherein the region-based segmentation involves growing regions from one or more seed points or pixels on at least an image based on a similarity criterion. Similarity criterion may include, without limitation, color, intensity, texture, and/or the like. In a non-limiting example, region-based segmentation may include region growing, region merging, watershed algorithms, and the like.

With continued reference to FIG. 1, in some embodiments, processor 102 may be configured to analyze image data 130 or user input 136 to determine a label of image data 130 or user input 136. For the purposes of this disclosure, a "label of image data or user input," also called "image data or user input label" is a descriptive information of image data or user input based on specific attributes, or criteria. In some embodiments, label of image data 130 or user input 136 may represent image data 130 or user input 136. As a non-limiting example, label of image data 130 or user input 136 may include positive, negative, neutral, or the like. In some embodiments, label of image data 130 or user input 136 may categorize image data 130 or user input 136. In some embodiments, label of image data 130 or user input 136 may be stored in database 116. In some embodiments, label of image data 130 or user input 136 may be retrieved from database 116. In some embodiments, label of image data 130 or user input 136 may be manually inputted by a user. In some embodiments, processor 102 may implement fuzzy set as described in detail with respect to FIG. 7 to determine a label of image data 130 or user input 136.

Still referring to FIG. 1, in some embodiments, prompt 124 in audio format may be processed using automatic speech recognition. In some embodiments, automatic speech recognition may require training (i.e., enrollment). In some cases, training an automatic speech recognition model may require an individual speaker to read text or isolated vocabulary. In some cases, training data may include an audio component having prompt 124, the contents of which are known a priori by a computing device. Computing device may then train an automatic speech recognition model according to training data which includes prompt 124 correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process is an automatic speech recognition process that does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" is a process of identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within prompt 124, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., prompt 124) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., prompt 124). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., prompt 124) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., prompt 124) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 3-5. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify prompt 124 over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, image data 130 may be processed using optical character recognition. In some embodiments, optical character recognition or optical character reader (OCR) includes automatic conversion of images of written (e.g., typed, handwritten or printed text) into machine-encoded text. In some cases, recognition of at least a keyword from image data 130 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image data 130. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image data 130 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image data 130. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image data 130.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of image data 130. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 3-5. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image data 130. Since the adaptive classifier may have learned something useful a little too late to recognize characters on the first pass, a second pass is run over the image data 130. Second pass may include adaptive recognition and use characters recognized with high confidence on the first pass to recognize better remaining characters on the second pass. In some cases, two-pass approach may be advantageous for unusual fonts or low-quality image data 130. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of image data 130. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring now to FIG. 1, memory 104 contains instructions configuring processor 102 to using user interface 108, receive a prompt 124 from a user 112. For the purposes of this disclosure, a "prompt" is a data input or command provided by a user to a computer system, software application, or interface. As a non-limiting example, user may input prompt 124 using chatbot, user interface 108 of display 106, or the like. In some embodiments, prompt 124 may include a directive or query expressed in natural language, code, or any other format. In some embodiments, prompt 124 may include text, audio, gestures, button clicks, image, video, or the like. In some embodiments, prompt 124 may instruct or request apparatus 100 or processor 102 to perform a specific action, provide information, or engage in a dialogue with user. As a non-limiting example, prompt 124 may include a question related to instructional content 110. In some embodiments, processor 102 may store prompt 124 in database 116. In some embodiments, processor 102 may retrieve prompt 124 from database 116.

Still referring to FIG. 1, memory 104 contains instructions configuring processor 102 to using a large language model (LLM) 118, generate a natural language response 122 based on prompt 124 and instructional content 110. For the purposes of this disclosure, a "natural language response" is a response for a prompt that is in a natural language format. As a non-limiting example, natural language response 122 may include an answer to a question (prompt 124) in the context of instructional content 110. For example, and without limitation, if a prompt 124 from a user 112 includes "How do I do that technique? Show me in detail," processor 102 may process prompt 124 and a correlated part of instructional content 110, and may generate natural language response 122 that answers to the prompt 124. In some embodiments, natural language response 122 may include texts, audio, and the like. In some embodiments, processor 102 may retrieve natural language response 122 from database 116.

Still referring to FIG. 1, in some embodiments, generating a combined prompt 138 based on prompt 124, instructional content 110, and prompt supplement 134 or label of image data 130 or user input 136 and using LLM 118, generating natural language response 122 based on the combined prompt 138. For the purposes of this disclosure, a "combined prompt" is a comprehensive data related to a prompt, instructional content, and prompt supplement. As a non-limiting example, combined prompt 138 may include a summary of prompt 124, instructional content 110, and prompt supplement 134. In some embodiments, processor 102 may generate combined prompt 138 using LLM 118 trained with LLM training data 140. In some embodiments, LLM training data 140 may include exemplary prompts, instructional contents, and prompt supplements or labels of image data or user input correlated to exemplary combined prompts. The LLM 118 and LLM training data 140 described herein are further described in detail below.

Still referring to FIG. 1, in some embodiments, a language model may be used to process prompt 124. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, in some embodiments, a language model may be configured to extract one or more words from a document. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, abbreviations, spaces, whitespace, and other symbols. Textual data may be parsed into tokens, which may include a simple word (sequence of letters separated by whitespace) or more generally a sequence of characters. As used herein, a "token," is a smaller, individual grouping of text from a larger source of text. Tokens may be broken up by word, pair of words, sentence, or other delimitations. Tokens may in turn be parsed in various ways. Textual data may be parsed into words or sequences of words, which may be considered words as well. Textual data may be parsed into "n-grams," where all sequences of n consecutive characters are considered. Any or all possible sequences of tokens or words may be stored as chains, for example for use as a Markov chain or Hidden Markov Model.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 102 may determine one or more language elements in prompt 124 by identifying and/or detecting associations between one or more language elements (including phonemes or phonological elements, morphemes or morphological elements, syntax or syntactic elements, semantics or semantic elements, and pragmatic elements) extracted from at least prompt 124, including without limitation mathematical associations, between such words. Associations between language elements and relationships of such categories to other such term may include, without limitation, mathematical associations, including without limitation statistical correlations between any language element and any other language element and/or Language elements. Processor 102 may compare an input such as a sentence from prompt 124 with a list of keywords or a dictionary to identify language elements. For example, processor 102 may identify whitespace and punctuation in a sentence and extract elements comprising a string of letters, numbers or characters occurring adjacent to the whitespace and punctuation. Processor 102 may then compare each of these with a list of keywords or a dictionary. Based on the determined keywords or meanings associated with each of the strings, processor 102 may determine an association between one or more of the extracted strings and a feature of an entity operating apparatus 100, such as an association [write something like: between a string containing the word "premium" and an insurance company operating apparatus 100]. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 102 may be configured to determine one or more language elements in prompt 124 using machine learning. For example, processor 102 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 102 may be configured to determine one or more language elements in prompt 124 using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ã/, and /t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 102, or another computing device. Language classification training data may create associations between any type of language element in any format and other type of language element in any format. Additionally, or alternatively, language classification training data may associate language element input data to a feature related to an operator of apparatus 100.

Still referring to FIG. 1, processor 102 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 102 may then calculate a likelihood table by calculating probabilities of different data entries and classification labels. Processor 102 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 102 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, language processing module may use a corpus of documents to generate associations between language elements in a language processing module, and a diagnostic engine may then use such associations to analyze words extracted from one or more documents and determine that the one or more documents indicate significance of a category. In an embodiment, a computing device may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into a computing device. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring now to FIG. 1, a "large language model," as used herein, is a deep learning algorithm that can recognize, summarize, translate, predict and/or generate text and other content based on knowledge gained from massive datasets. LLM 118 may be a type of generative artificial intelligence (AI). LLMs 118 may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs 118, in some embodiments, may include GPT, GPT-2, GPT-3, and other language processing models. LLM 118 may be used to augment the text in an article based on a prompt. Training data may correlate prompt 124 or language elements and instructional content 110 to plurality of natural language response 122. Training data may correlate elements of a dictionary related to linguistics to a response. LLM 118 may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM 118 may output such predictions by ranking words by likelihood or a prompt parameter. For the example given above, the LLM 118 may score "you" as the most likely, "your" as the next most likely, "his" or "her" next, and the like.

Still referring to FIG. 1, LLM 118 may include an attention mechanism, utilizing a transformer as described further below. An "attention mechanism," as used herein, is a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM 118 may predict the next word by searching for a set of position in a source sentence where the most relevant information is concentrated. LLM 118 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM 118 may include encoder-decoder model incorporating an attention mechanism.

Still referring to FIG. 1, LLM 118 may include a transformer architecture. In some embodiments, encoder component of LLM 118 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

Still referring to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 118 may predict the next word by searching for a set of position in a source sentence where the most relevant information is concentrated. LLM 118 may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM 118, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 118 may pick up particular parts at different positions in the input sequence and over time compute an initial composition of the output sequence. In multi-head attention, LLM 118 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 118 may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM 118 may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 118 may either attend to all source words or predict the target sentence, thereby attending to a smaller subset of words.

Still referring to FIG. 1, multi-headed attention in encoder may apply a specific attention mechanism called self-attention. Self-attention allows the models to associate each word in the input, to other words. So, as a non-limiting example, the LLM 118 may learn to associate the word "you," with "how" and "are." It's also possible that LLM 118 learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referring to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

Still referring to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Still referring to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

Still referring to FIG. 1, in some embodiments, input to decoder may go through an embedding layer and positional encoding layer in order to obtain positional embeddings. Decoder may include a fist multi-headed attention layer, wherein the first multi-headed attention layer may receive positional embeddings.

Still referring to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

Still referring to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM 118 to learn to extract and focus on different combinations of attention from its attention heads.

Still referring to FIG. 1, in some embodiments, LLM 118 may be specifically trained using large language model (LLM) training data 140. LLM training data 140 may include correlations between prompts or combined prompts and exemplary natural language responses. In some embodiments, LLM training data 140 may include a set of data that is in user's voice, email, or the like to mimic them. In some embodiments, LLM training data 140 may be consistent with any training data described in the entirety of this disclosure. In some embodiments, LLM training data 140 may be received from one or more users, database 116, external computing devices, and/or previous iterations of processing. As a non-limiting example, LLM training data 140 may include instructions from a user, who may be an expert user, a past user in embodiments disclosed herein, or the like, which may be stored in memory and/or stored in database 116, where the instructions may include labeling of training examples. In some embodiments, LLM training data 140 may be updated iteratively through a feedback loop. As a non-limiting example, LLM training data 140 may be updated iteratively through a feedback loop as a function of newly collected prompt 124, language elements, instructional content 110, output of machine-learning models described herein, or the like. In some embodiments, processor 102 may be configured to generate LLM 118. In a non-limiting example, generating LLM 118 may include training, retraining, or fine-tuning LLM 118 using LLM training data 140 or updated LLM training data 140. In some embodiments, processor 102 may be configured to generate natural language response 122 using LLM 118 (i.e. trained or updated LLM 118).

Still referring to FIG. 1, in some embodiments, processor 102 may implement one or more aspects of "generative artificial intelligence," a type of artificial intelligence (AI) that uses machine learning algorithms to create, establish, or otherwise generate data such as, without limitation, natural language response 122 and/or the like in any data structure as described herein (e.g., text, image, video, audio, among others) that is similar to one or more provided training examples. In an embodiment, machine learning module described herein may generate one or more generative machine learning models that are trained on one or more sets of LLM training data 140. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, a "generative model" refers to a statistical model of the joint probability distribution $P(X, Y)$ on a given observable variable x, representing features or data that can be directly measured or observed and target variable y, representing the outcomes or labels that one or more generative models aims to predict or generate. For example, such variable x may include prompts 124 and/or instructional contents 110 and such variable y may include natural language response 122.

Still referring to FIG. 1, in some cases, generative models may rely on Bayes theorem to find joint probability; for instance, and without limitation, Naïve Bayes classifiers may be employed by computing device to categorize input data such as, without limitation, prompts 124 and/or instructional contents 110 into different categories.

Still referring to FIG. 1, in some embodiments, one or more generative machine learning models may include one or more Naïve Bayes classifiers generated, by computing device, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing Device may then calculate a likelihood table by calculating probabilities of different data entries and classification labels. Computing device may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein due to its capability of modeling the joint probability distribution $P(X, Y)$ over observable variables X and target variable Y. In an embodiment, Naïve Bayes classifier may be configured to make an assumption that the features X are conditionally independent given class label Y, allowing generative model to estimate the joint distribution as $P(X, Y)=P(Y)\Pi_i P(X_i|Y)$, wherein $P(Y)$ may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine learning models containing Naïve Bayes classifiers may select a class label y according to prior distribution $P(Y)$, and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of natural language response 122 based on classification of prompts 124 and/or instructional contents 110 (e.g. beginner, intermediate, and advanced), wherein the models may be trained using training data containing a plurality of features e.g., features of prompts 124 and/or instructional contents 110, and/or the like as input correlated to a plurality of labeled classes e.g., beginner, intermediate, and advanced as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 3.

Still referring to FIG. 1, in some embodiments, discriminator may include one or more discriminative models, i.e., models of conditional probability $P(Y|X=x)$ of target variable Y, given observed variable X. In an embodiment, discriminative models may learn boundaries between classes or labels in given training data. In a non-limiting example, discriminator may include one or more classifiers as described in further detail below with reference to FIG. 3 to distinguish between different categories such as real vs fake or correct vs incorrect, or states such as TRUE vs. FALSE within the context of generated data such as, without limitations, natural language response 122, and/or the like. In some cases, computing device may implement one or more classification algorithms such as, without limitation, Support Vector Machines (SVM), Logistic Regression, Decision Trees, and/or the like to define decision boundaries.

Still referring to FIG. 1, in some embodiments, generator of GAN may be responsible for creating synthetic data that resembles real natural language response 122. In some cases, GAN may be configured to receive prompts 124 and/or instructional contents 110 as input and generates corresponding natural language response 122 containing information describing or evaluating the performance of one or more instances of prompts 124 and/or instructional contents 110. On the other hand, discriminator of GAN may evaluate the authenticity of the generated content by comparing it to real natural language response 122, for example, discriminator may distinguish between genuine and generated content and providing feedback to generator to improve the model performance.

Still referring to FIG. 1, in some embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

Still referring to FIG. 1, in some embodiments, VAE may be used by computing device to model complex relationships between prompts 124 and/or instructional contents 110. In some cases, VAE may encode input data into a latent space, capturing natural language response 122. Such encoding process may include learning one or more probabilistic mappings from observed prompts 124 and/or instructional contents 110 to a lower-dimensional latent representation. Latent representation may then be decoded back into the original data space, therefore reconstructing the prompts 124 and/or instructional contents 110. In some cases, such decoding process may allow VAE to generate new examples or variations that are consistent with the learned distributions.

Still referring to FIG. 1, in some embodiments, one or more generative machine learning models may be trained on audio-visual data as described herein, wherein the audio-visual data may provide visual/acoustic information that generative machine learning models analyze to understand the dynamics of users 112. In other embodiments, training data may also include voice-over instructions, feedback, or the like. In some cases, such data may help generative machine learning models to learn appropriate language and tone for providing an audio natural language output.

Still referring to FIG. 1, in some embodiments, one or more generative machine learning models may utilize one or more predefined templates representing, for example, and without limitation, correct natural language response 122. In a non-limiting example, one or more templates (i.e., predefined models or representations of correct and ideal natural language response 122) may serve as benchmarks for comparing and evaluating prompts 124 and/or instructional contents 110.

Still referring to FIG. 1, computing device may configure generative machine learning models to analyze input data to one or more predefined templates, thereby allowing computing device to identify discrepancies or deviations from a desired form of natural language response 122. In some cases, computing device may be configured to pinpoint specific errors in prompts 124 and/or instructional contents 110. In a non-limiting example, computing device may be configured to implement generative machine learning models to incorporate additional models to detect additional instances of prompts 124 and/or instructional contents 110. In some cases, errors may be classified into different categories or severity levels. In a non-limiting example, some errors may be considered minor, and generative machine learning model such as, without limitation, GAN may be configured to generate natural language response 122 containing only slight adjustments while others may be more significant and demand more substantial corrections. In some embodiments, computing device may be configured to flag or highlight [an example error in input data] and computing device may edit prompts 124 and/or instructional contents 110 using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

Still referring to FIG. 1, in some cases, computing device may be configured to identify, and rank detected common deficiencies across a plurality of data sources; for instance, and without limitation, one or more machine learning models may classify errors in a specific order such as by ranking deficiencies in a descending order of commonality. Such ranking process may enable a prioritization of most prevalent issues, allowing instructors or computing device to address the issue.

Still referring to FIG. 1, in some cases, one or more generative machine learning models may also be applied by computing device to edit, modify, or otherwise manipulate existing data or data structures. In an embodiment, output of training data used to train one or more generative machine learning models such as GAN as described herein may include training data that linguistically or visually demonstrate modified prompts 124 and/or instructional contents 110. In some cases, natural language response 122 may be synchronized with prompts 124 and/or instructional contents 110. In some cases, such natural language response 122 may be integrated with the prompts 124 and/or instructional contents 110, offering a user a multisensory instructional experience.

Still referring to FIG. 1, computing device may be configured to continuously monitor prompts 124 and/or instructional contents 110. In an embodiment, computing device may configure discriminator to provide ongoing feedback and further corrections as needed to subsequent input data. In some cases, one or more sensors such as, without limitation, wearable device, motion sensor, or other sensors or devices described herein may provide additional prompts 124 and/or instructional contents 110 that may be used as subsequent input data or training data for one or more generative machine learning models described herein. An iterative feedback loop may be created as computing device continuously receive real-time data, identify errors as a function of real-time data, delivering corrections based on the identified errors, and monitoring [a response from a user or other entity] on the delivered corrections. In an embodiment, computing device may be configured to retrain one or more generative machine learning models based on [a response from a user or other entity] or update training data of one or more generative machine learning models by integrating [a response from a user or other entity] into the original training data. In such embodiment, iterative feedback loop may allow machine learning module to adapt to a user's needs, enabling one or more generative machine learning models described herein to learn and update based on [a response from a user or other entity] and generated feedback.

Still referring to FIG. 1, other exemplary embodiments of generative machine learning models may include, without limitation, long short-term memory networks (LSTMs), (generative pre-trained) transformer (GPT) models, mixture density networks (MDN), and/or the like.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by computing device to generate natural language response 122. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others.

Still referring now to FIG. 1, memory 104 contains instructions configuring processor 102 to determine a digital avatar pose demonstration datum 144 as a function of natural language response 122 and instructional content 110. Digital avatar pose demonstration datum 144 includes a plurality of vertices 146 of digital avatar 120 and key frame data 148. In some embodiments, key frame data 148 may include vertex position data 150. For the purposes of this disclosure, a "digital avatar pose demonstration datum" is a data element related to positioning or movement of a digital avatar that visually represents an action, technique, or stance. In some embodiments, digital avatar pose demonstration datum 144 may include detailed positioning of digital avatar 120 to convey certain poses or movements. As a non-limiting example, digital avatar pose demonstration datum 144 may include a demonstration of a technique (e.g., physical technique, surgical technique, and the like) for handling a patient. For example, and without limitation, digital avatar pose demonstration datum 144 may include a demonstration of physical technique such as one hand grip, block and move, two hand grip, feed the bite, hair pull release, pinching, strangling, bear hug, hip hold, and the like. For the purposes of this disclosure, "vertices" are individual points that make up a structure or mesh of a digital avatar. In some embodiments, processor 102 may manipulate these vertices 146 to create different poses and movements of digital avatar (digital avatar pose demonstration datum 144). As a non-limiting example, each vertex 146 may correspond to a point in three dimensional (3D) space, and by adjusting the position of these vertices 146, digital avatar 120 can simulate various poses and actions (digital avatar pose demonstration datum 144). For the purposes of this disclosure, "key frame data" is data related to specific points in an animation sequence that define the start or end of a movement. As a non-limiting example, key frame data 148 for digital avatar 120 may include positional information at key points, which processor 102 can interpolate to create smooth transitions between poses (digital avatar pose demonstration datum 144). For example, and without limitation, if digital avatar 120 moves from a neutral position (e.g., original position in instructional content 110) to a defensive stance (e.g., digital avatar pose demonstration datum 144), key frames at each of these stages may allow the animation to transition naturally between these positions. For the purposes of this disclosure, "vertex position data" is data related to spatial coordinates of each vertex in a specific pose or at a particular key frame. In a non-limiting example, vertex position data 150 may define a structure and posture of digital avatar at any key frame (key frame data 148) for digital avatar pose demonstration datum 144. In some embodiments, digital avatar pose demonstration datum 144 may be stored in database 116. In some embodiments, processor 102 may retrieve digital avatar pose demonstration datum 144 from database 116. In some embodiments, user may manually determine digital avatar pose demonstration datum 144.

Still referring to FIG. 1, apparatus 100 may determine digital avatar pose demonstration datum 144 using pose demonstration machine-learning model 126. Pose demonstration machine-learning model 126 may be trained using a supervised learning algorithm. Pose demonstration machine-learning model 126 may include a neural network. pose demonstration machine-learning model 126 may be trained on pose demonstration training data 152 including examples of prompts 124, natural language response 122 and/or instructional content 110, associated with examples of digital avatar pose demonstration datum 144. Pose demonstration training data 152 may be obtained by, for example, a database, such as any database described in this disclosure, or be provided by a user. In other embodiments, a machine-learning module may obtain pose demonstration training data 152 by querying a communicatively connected database that includes past inputs and outputs. Once pose demonstration machine-learning model 126 is trained, it may be used to determine digital avatar pose demonstration datum 144. Apparatus 100 may input natural language response 122 and instructional content 110 into pose demonstration machine-learning model 126, and apparatus 100 may receive digital avatar pose demonstration datum 144 from the model.

Still referring to FIG. 1, in some embodiments, pose demonstration machine-learning model 126 may be trained using a reinforcement learning algorithm. For example, pose demonstration machine-learning model 126 may be given inputs such as prompts 124, natural language response 122 and/or instructional content 110, and pose demonstration machine-learning model 126 may be adjusted based on a cost function, where the cost function is based on the model's output. Such a cost function may take into account, for example, user feedback, and/or manual assessment of prompts 124, natural language response 122 and instructional content 110 by humans.

Still referring to FIG. 1, in some embodiments, training data (e.g., pose demonstration training data 152) such as example prompts 124, natural language response 122 and/or instructional content 110 and example digital avatar pose demonstration datum 144 may be split into one or more subsets. In some embodiments, a training data subset may include a training set, which may be used to directly train model parameters. In some embodiments, a training data subset may include a validation set, which may be used to evaluate a model trained on a training set. In some embodiments, one or more aspects of a model may be determined based on performance of a model's performance on a validation set. In non-limiting examples, a learning rate may be changed, a learning algorithm may be changed, or a feature may be added or removed based on model performance on a validation set. In some embodiments, a training data subset may include a test set. In some embodiments, a test set may be used to evaluate a model which performs sufficiently well on a validation set. In some embodiments, splitting of training data into subsets may be performed such that each subset is representative of the entire data set. In a non-limiting example, splitting of training data into subsets may be performed such that which instances of data enter which subset is determined randomly. In some embodiments, data may be split into subsets at a predetermined ratio. In a non-limiting example, training data may be split such that 70% of the training data is in a training set, 15% is in a validation set, and 15% is in a test set. In some embodiments, a model is not trained on data in a test set and/or a validation set. In some embodiments, there is no overlap between data in a training set, a test set, and a validation set. In some embodiments, splitting training data into multiple subsets may reduce overfitting.

Still referring to FIG. 1, in some embodiments, pose demonstration machine-learning model 126 may encode and/or decode data such as inputs to pose demonstration machine-learning model 126. For example, pose demonstration machine-learning model 126 may generate encoded prompts 124, natural language response 122 and instructional content 110 and/or may decode encoded natural language response 122 and instructional content 110. In some embodiments, pose demonstration machine-learning model 126 may include a transformer neural network. For example, a machine-learning model, such as pose demonstration machine-learning model 126, may improve the performance power of processor 102 by generating a plurality of interest levels for each platform, wherein each interest level provides a linguistic score by analyzing the plurality of tracking metrics received by processor 102. The quantity of data that goes into generating the interest level may vary and fluctuate based on a plurality of variables, such as the quantity of platforms visited by a user, the implementation of tracking metrics, and the like. Without the implementation of a machine-learning model, there would be a trade in the performance power of processor 102, such as time and accuracy, in order to sort the data and generate interest levels that are then used in a separate classification process, as described further below, in order to generate a path that correlates to a user's interest. The ability to continuously train a machine-learning model cable of learning to identify new trends or correlations within a fluctuating quantity of data is a benefit that would not be realized otherwise, without the tradeoff in performance efficiency.

Still referring to FIG. 1, memory 104 contains instructions configuring processor 102 to using display 106, update user interface 108. For the purposes of this disclosure, a "display" is a device that presents visual information or data. As a non-limiting example, display 106 may present visual information or data in one or more forms of text, graphics, images, video, animation, and the like. In some embodiments, display 106 may be configured to provide a way for a user 112 to view and/or interact with information, including but not limited to digital avatar 120, digital avatar pose demonstration datum 144, natural language response 122, image data 130, overlaid digital avatar pose demonstration datum 154, instruction display element 156, and/or the like. In some embodiments, display 106 may be implemented in any device disclosed in the entirety of this disclosure. A display 106 may communicate digital avatar display element 158 to user 112. A display 106 may include, for example, a smartphone screen, a computer screen, or a tablet screen. A display 106 may be configured to provide a visual interface. A visual interface may include one or more virtual interactive elements such as, without limitation, buttons, menus, and the like. A display 106 may include one or more physical interactive elements, such as buttons, a computer mouse, or a touchscreen, which allow user 112 to input data into the display 106. Interactive elements may be configured to enable interaction between a user 112 and a computing device. In some embodiments, a visual element data structure is determined as a function of data input by user 112 into a display 106. In some embodiments, display 106 may include different technologies, such as liquid crystal display 106 (LCD), a light-emitting diode (LED), organic light-emitting diode (OLED), plasma, projection, touch screen, and/or the like. In some embodiments, display 106 may include varying resolutions, sizes, and aspect ratios.

Still referring to FIG. 1, updating user interface 108 includes generating a digital avatar display element 158 configured to display digital avatar pose demonstration datum 144 to a user 112 and communicating natural language response 122 to the user 112. For the purposes of this disclosure, a "digital avatar display element" is a graphical component within a user interface that visually presents a digital avatar to a user. As a non-limiting example, digital avatar display element 158 may be configured to show digital avatar 120 in various poses or actions (digital avatar pose demonstration datum 144) that correspond to instructional content 110 and natural language response 122. In some embodiments, digital avatar display element 158 may include one or more elements of text, images, shapes, charts, particle effects, interactable features, and the like. In some embodiments, digital avatar display element 158 may be interacted with. For example, digital avatar display element 158 may include an interface, such as a button or menu. In some embodiments, digital avatar display element 158 may be interacted with using a display 106 such as a smartphone. In some embodiments, user interface 108 may include an instruction display element 156, wherein the instruction display element 156 may be configured to display natural language response 122 to a user 112. For the purposes of this disclosure, an "instruction display element" is a graphical component within a user interface that visually presents a natural language response to a user. In some embodiments, instruction display element 156 may be interacted with. For example, instruction display element 156 may include an interface, such as a button or menu. In some embodiments, instruction display element 156 may be interacted with using a display 106 such as a smartphone.

Still referring to FIG. 1, in some embodiments, updating user interface 108 may include determining an overlaid digital avatar pose demonstration datum 154 as a function of digital avatar pose demonstration datum 144 and image data 130 and displaying the overlaid digital avatar pose demonstration datum 154 on top of the digital avatar pose demonstration datum 144. For the purposes of this disclosure, an "overlaid digital avatar pose demonstration datum" is a data element related to positioning or movement of a digital avatar based on a user's positioning or movement from image data. In some embodiments, overlaid digital avatar pose demonstration datum 154 may include detailed positioning of a user 112 in image data 130 to convey certain poses or movements of the user 112. As a non-limiting example, digital avatar pose demonstration datum 144 may include a user's attempt to follow a demonstration of a technique (e.g., physical technique, surgical technique) in instructional content 110. For example, digital avatar pose demonstration datum 144 may include a demonstration of one hand grip, block and move, two hand grip, feed the bite, hair pull release, pinching, strangling, bear hug, hip hold, and the like. As a non-limiting example, overlaid digital avatar pose demonstration datum 154 can be overlayed onto digital avatar pose demonstration datum 144. In some embodiments, a verb "superimpose" and a verb "display" can be used interchangeably. For the purposes of this disclosure, "superimpose" is the process of overlaying an image onto another image. In some embodiments, processor 102 may be further configured to determine a superimpose position for the overlaid digital avatar pose demonstration datum 154. For the purpose of this disclosure, a "superimpose position" is a position that an overlaid digital avatar pose demonstration datum can be superimposed on to a digital avatar pose demonstration datum. In an embodiment, superimpose position may include a position of overlaid digital avatar pose demonstration datum 154 in a field coordinate system. As another non-limiting example, superimpose position may be obtained using a machine vision system. In some embodiments, processor 102 may display overlaid digital avatar pose demonstration datum 154 on top of digital avatar pose demonstration datum 144 as a function of superimpose position.

Still referring to FIG. 1, in some embodiments, updating user interface 108 may include determining a viewing perspective 160 as a function of a user input 136, generating digital avatar pose demonstration datum 144 as a function of the viewing perspective 160 and updating the user interface 108 in response to digital avatar pose demonstration datum 144. In some embodiments, generating digital avatar pose demonstration datum 144 may include receiving a pose selection request 162 of a user input 136 and generating the digital avatar pose demonstration datum 144 as a function of the pose selection request 162. For the purposes of this disclosure, a "user input" is any input that is input from a user. In some embodiments, user input 136 may be related to displayed digital avatar pose demonstration datum 144, instructional content 110, natural language response 122, instruction display element 156, and the like. As a non-limiting example, user input 136 may include a Boolean value (e.g., validate or invalidate). As another non-limiting example, user input 136 may include a viewing perspective 160. For the purposes of this disclosure, a "viewing perspective" is a specific spatial orientation or angle from which a digital scene, object, or avatar is displayed to a user. In a non-limiting example, viewing perspective 160 may include how user 112 visually perceives digital avatar 120 and/or digital avatar pose demonstration datum 144. For instance, and without limitation, a viewing perspective 160 may include a close-up angle focusing on digital avatar's hands for a demonstration involving fine motor skills or set to a wider angle that captures the avatar's full body for larger movement demonstrations. As another non-limiting example, user input 136 may include a pose selection request 162. For the purposes of this disclosure, a "pose selection request" is an input or command that is related to a particular pose for a digital avatar. For example, and without limitation, pose selection request 162 may include a request from a user 112 for additional information or content related to a specific pose (e.g., digital avatar pose demonstration datum 144). In some embodiments, generating digital avatar display element 158 may include receiving a user input 136 for the instruction display element 156 and updating the digital avatar display element 158 as a function of the user input 136. In some embodiments, user input 136 may be stored in database 116. In some embodiments, user input 136 may be retrieved from database 116. In some embodiments, user 112 may manually input a user input 136 using a display 106.

Still referring to FIG. 1, in some embodiments, determining digital avatar pose demonstration datum 144 may include appending instructional content 110 for the digital avatar pose demonstration datum 144 using LLM 118 and generating a pose description 164 of the digital avatar pose demonstration datum 144 using the LLM 118. For the purposes of this disclosure, "appending" an instructional content with a digital avatar pose demonstration datum refers to associating the instructional content 110 with the digital avatar pose demonstration datum. In some embodiments, processor 102 may associate instructional content 110 and digital avatar pose demonstration datum 144 using LLM 118 that is trained with LLM training data 140, wherein the LLM training data 140 may include exemplary instructional contents and exemplary digital avatar pose demonstration data correlated to exemplary pose descriptions. For the purposes of this disclosure, a "pose description" is a text or explanation that characterizes a digital avatar pose demonstration datum. As a non-limiting example, pose description 164 may include explanation related to information about how each part of digital avatar 120 is positioned (e.g., digital avatar pose demonstration datum 144) and the purpose or intended context of the pose. As another non-limiting example, pose description 164 may include a textual explanation of digital avatar's current or intended pose (e.g., digital avatar pose demonstration datum 144), which could include the pose's purpose, significance, or detailed breakdown of the avatar's positioning and movement. In some embodiments, pose description 164 may be stored in database 116 and processor 102 may retrieve pose description 164 from database 116.

Still referring to FIG. 1, in some embodiments, processor 102 may display natural language response 122 through display 106. As a non-limiting example, processor 102 may display natural language response 122 in texts, audio, and the like. In some embodiments, display 106 may include an audio device. For the purposes of this disclosure, an "audio device" is a device that outputs audio information or data. As a non-limiting example, audio device may include a speaker. For the purposes of this disclosure, a "speaker" is a device that converts electrical signals into sound waves that can be heard by the human ear. In some embodiments, audio device may be configured to output natural language response 122 in audio format.

Still referring to FIG. 1, in some embodiments, processor 104 may generate digital avatar pose demonstration datum 144 using a large behavior model (LBM) 166. In some embodiments, pose demonstration machine-learning model 126 may include a large behavior model 166. For the purposes of this disclosure, a "large behavior model" is a complex computational model designed to simulate or predict human behavior across various contexts. Large behavior models 166 may be trained on large sets of data (LBM training data 168). LBM training data 168 may be drawn from diverse sets of data such as, as non-limiting examples, instruction video, video analysis, motion capture, and interaction logs, and the like. In some embodiments, LBM training data 168 of an LBM 166 may include information from one or more public or private databases. As a non-limiting example, LBM training data 168 may include databases associated with a user, instructor, behavioral health, health organization, or the like. In some embodiments, LBM training data 168 may include portions of videos related to behavioral health or physical techniques correlated to examples of outputs (e.g., digital avatar pose demonstration datum 144). In some embodiments, an LBM 166 may be generally trained. As used in this disclosure, a "generally trained" LBM is an LBM that is trained on a general training set comprising a variety of subject matters, data sets, and fields. In some embodiments, an LBM 166 may be initially generally trained.

Still referring to FIG. 1, additionally, or alternatively, an LBM 166 may be specifically trained. As used in this disclosure, a "specifically trained" LBM is an LBM that is trained on a specific training set, wherein the specific training set includes data including specific correlations for the LBM to learn. As a non-limiting example, an LBM 166 may be generally trained on a general training set, then specifically trained on a specific training set (LBM training data 168). In an embodiment, specific training of an LBM 166 may be performed using a supervised machine learning process. In some embodiments, generally training an LBM 166 may be performed using an unsupervised machine learning process. As a non-limiting example, specific training set LBM training data 168) may include information from a database 116. As a non-limiting example, specific training set (LBM training data 168) may include video related to physical techniques (instructional contents 110) and/or natural language response 122 correlated to examples of outputs (e.g., digital avatar pose demonstration datum 144, or the like). In an embodiment, training one or more machine learning models may include setting the parameters of the one or more models (weights and biases) either randomly or using a pretrained model. Generally training one or more machine learning models on various videos can provide a starting point for fine-tuning on a specific task.

Still referring to FIG. 1, a model such as an LBM 166 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LBM 166 may include fine-tuning the pretrained model using Low-Rank Adaptation (LoRA). Low-Rank Adaptation may be configured to make the training process more computationally efficient by avoiding a need to train an entire model from scratch. In an exemplary embodiment, a subset of parameters that are updated may include parameters that are associated with a specific task or domain.

Figure 2:
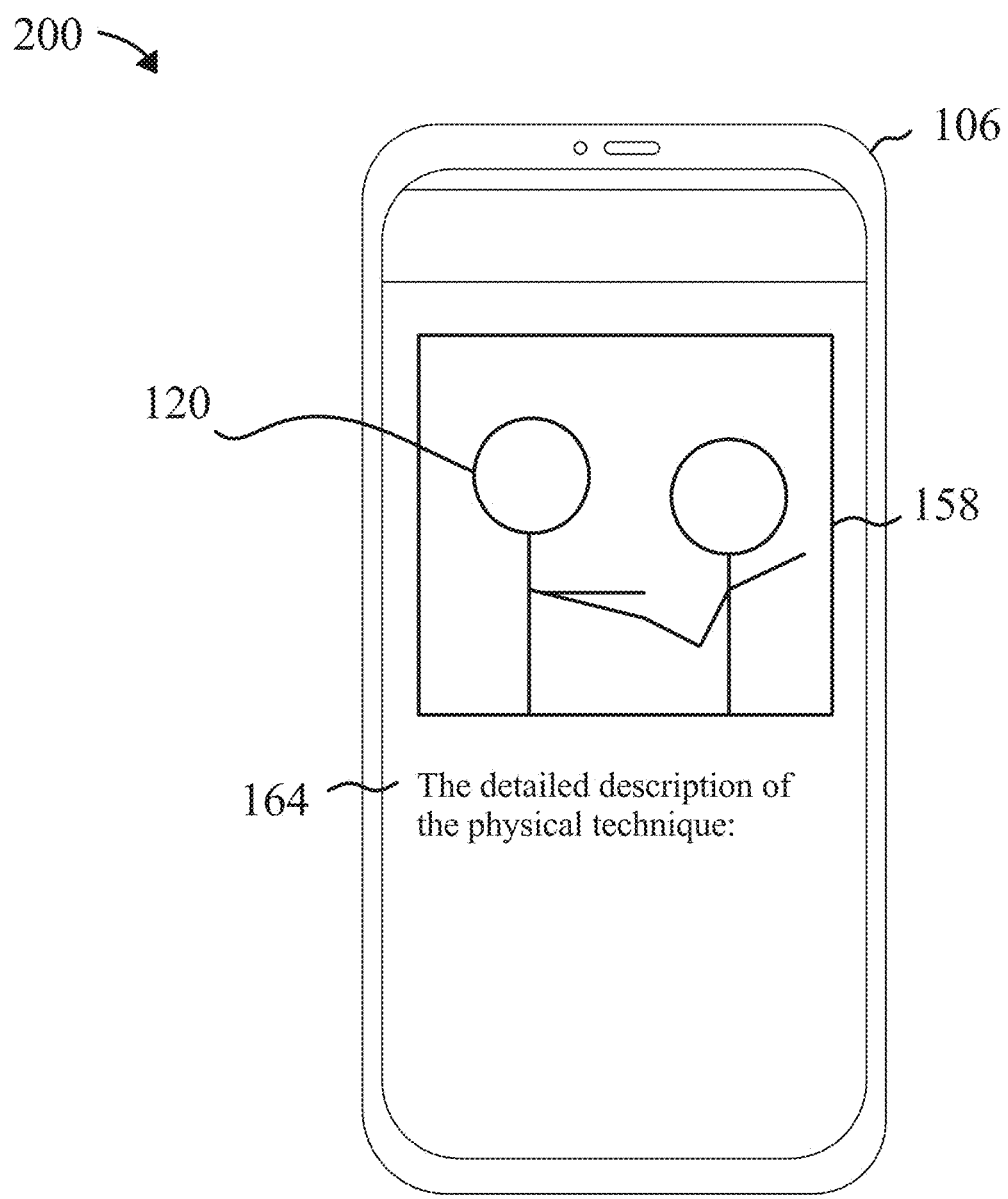
FIG. 2 illustrates an exemplary user interface displaying a digital avatar display element.

Referring now to FIG. 2, an exemplary user interface 200 displaying a digital avatar display element 158 on a display 106. In some embodiments, digital avatar display element 158 may display digital avatar 120 with a digital avatar pose demonstration datum 144. In some embodiments, digital avatar pose demonstration datum 144 may include detailed positioning of digital avatar 120 to convey certain poses or movements. As a non-limiting example, digital avatar pose demonstration datum 144 may include a demonstration of a technique (e.g., physical technique, surgical technique) for handling a disruptive medical patient. For example, digital avatar pose demonstration datum 144 may include a demonstration of one hand grip, block and move, two hand grip, feed the bite, hair pull release, pinching, strangling, bear hug, hip hold, and the like. In some embodiments, user interface 200 may display pose description 164 related to digital avatar pose demonstration datum 144. As a non-limiting example, pose description 164 may include explanation related to information about how each part of digital avatar 120 is positioned (e.g., digital avatar pose demonstration datum 144) and the purpose or intended context of the pose. As another non-limiting example, pose description 164 may include a textual explanation of digital avatar's current or intended pose (e.g., digital avatar pose demonstration datum 144), which could include the pose's purpose, significance, or detailed breakdown of the avatar's positioning and movement.

Figure 3:
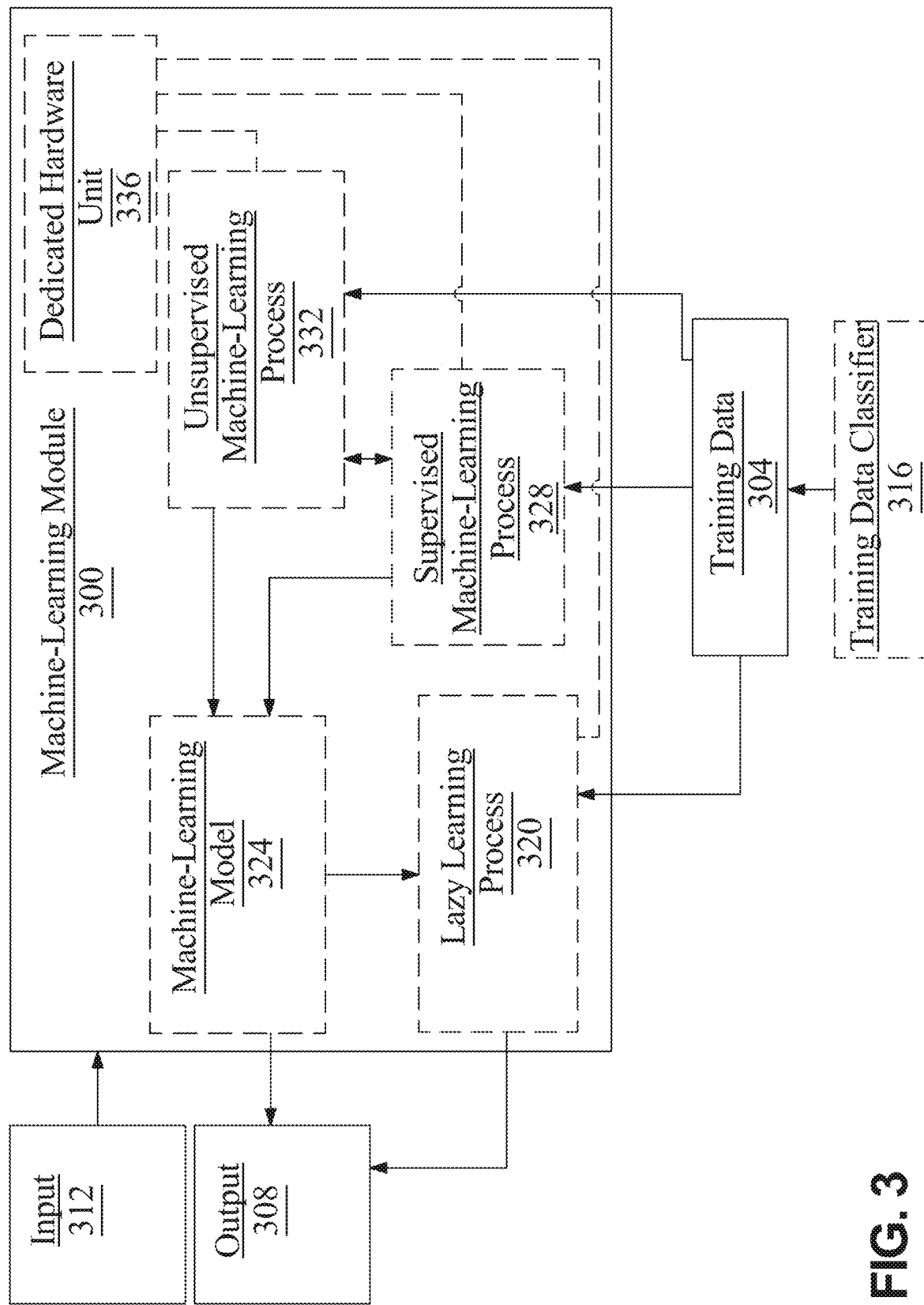
FIG. 3 illustrates a block diagram of an exemplary embodiment of a machine learning model.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include instructional content 110, prompt 124, natural language response 122, vertices 146, key frame data 148, vertex position data 150, image data 130, combined prompt 138, prompt supplement 134, user input 136, viewing perspective 160, pose selection request 162, and the like. As a non-limiting illustrative example, output data may include natural language response 122, combined prompt 138, prompt supplement 134, and the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to user cohorts related to user's field, position, industry, experience, and the like.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness.

Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and still referring to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

Still referring to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation—of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25$^{th}$ percentile value and the 50$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and still referring to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include instructional content 110, prompt 124, natural language response 122, vertices 146, key frame data 148, vertex position data 150, image data 130, combined prompt 138, prompt supplement 134, user input 136, viewing perspective 160, pose selection request 162, and the like as described above as inputs, natural language response 122, combined prompt 138, prompt supplement 134, and the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Still referring to FIG. 3, apparatus 100 may use user feedback (e.g., user input 136) to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

Still referring to FIG. 3, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 4:
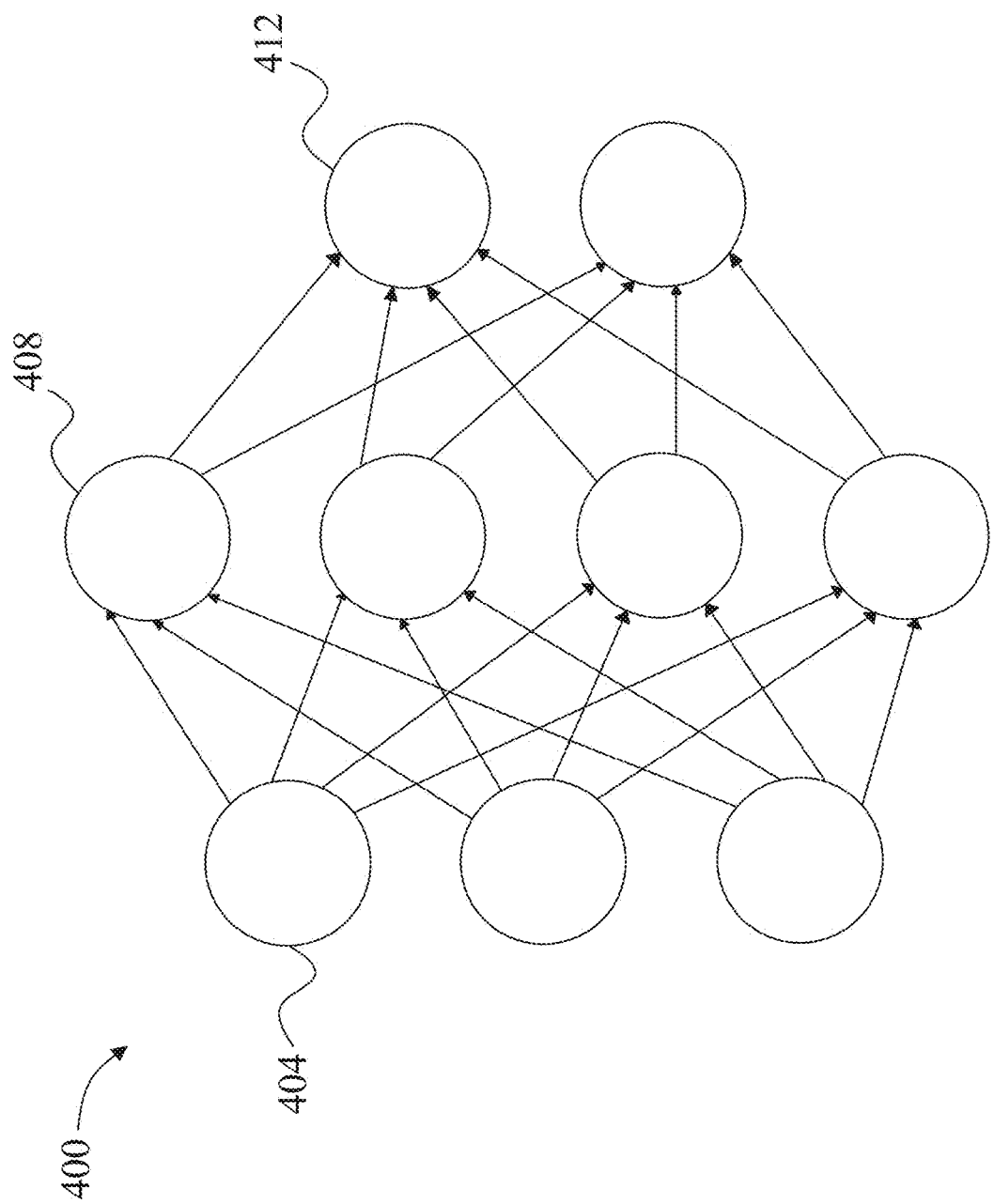
FIG. 4 illustrates a schematic diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes.

Figure 5:
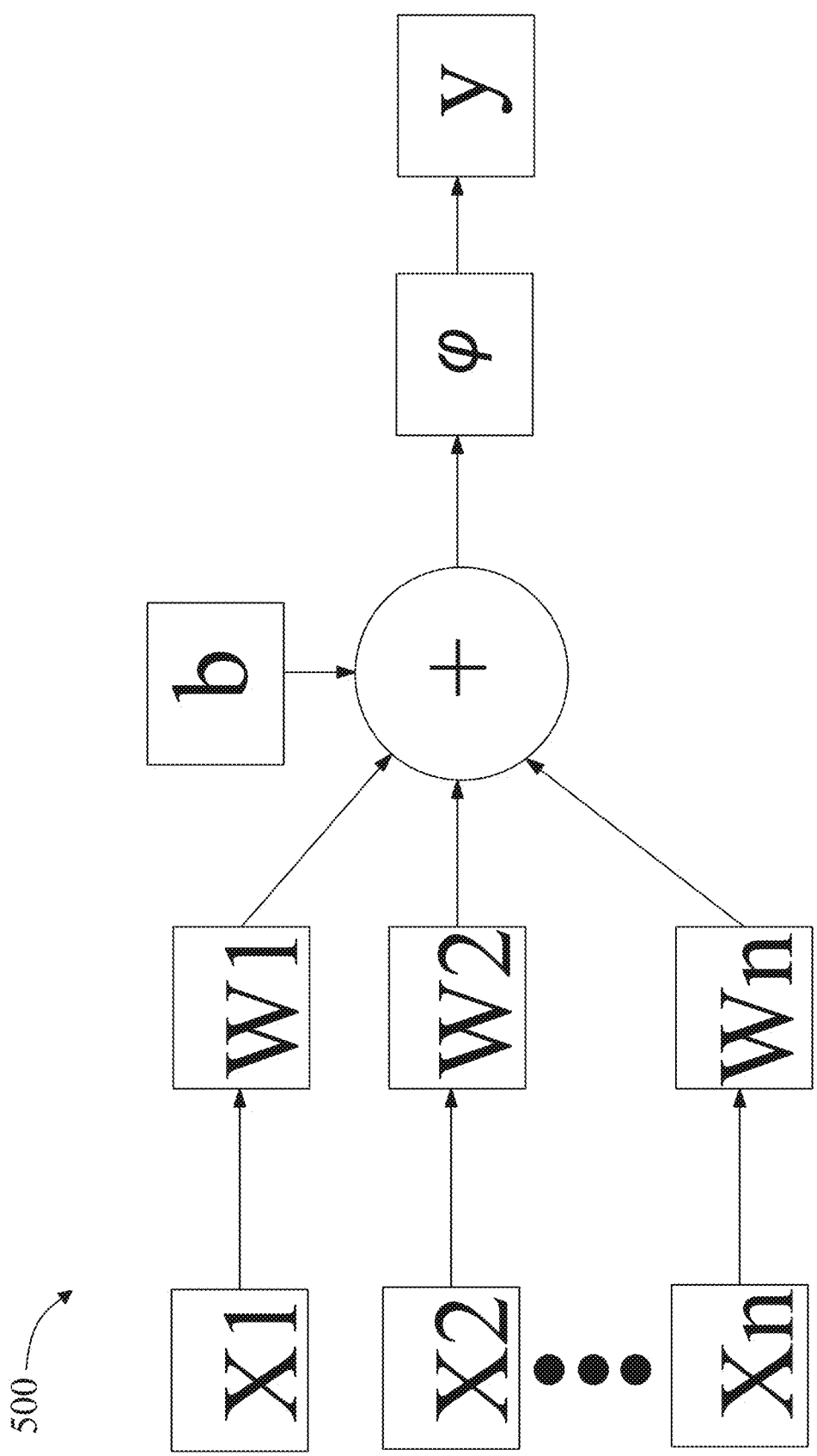
FIG. 5 illustrates a schematic diagram of an exemplary embodiment of a neural network node.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 5, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 5, in some embodiments, a convolutional neural network may learn from images. In nonlimiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 6:
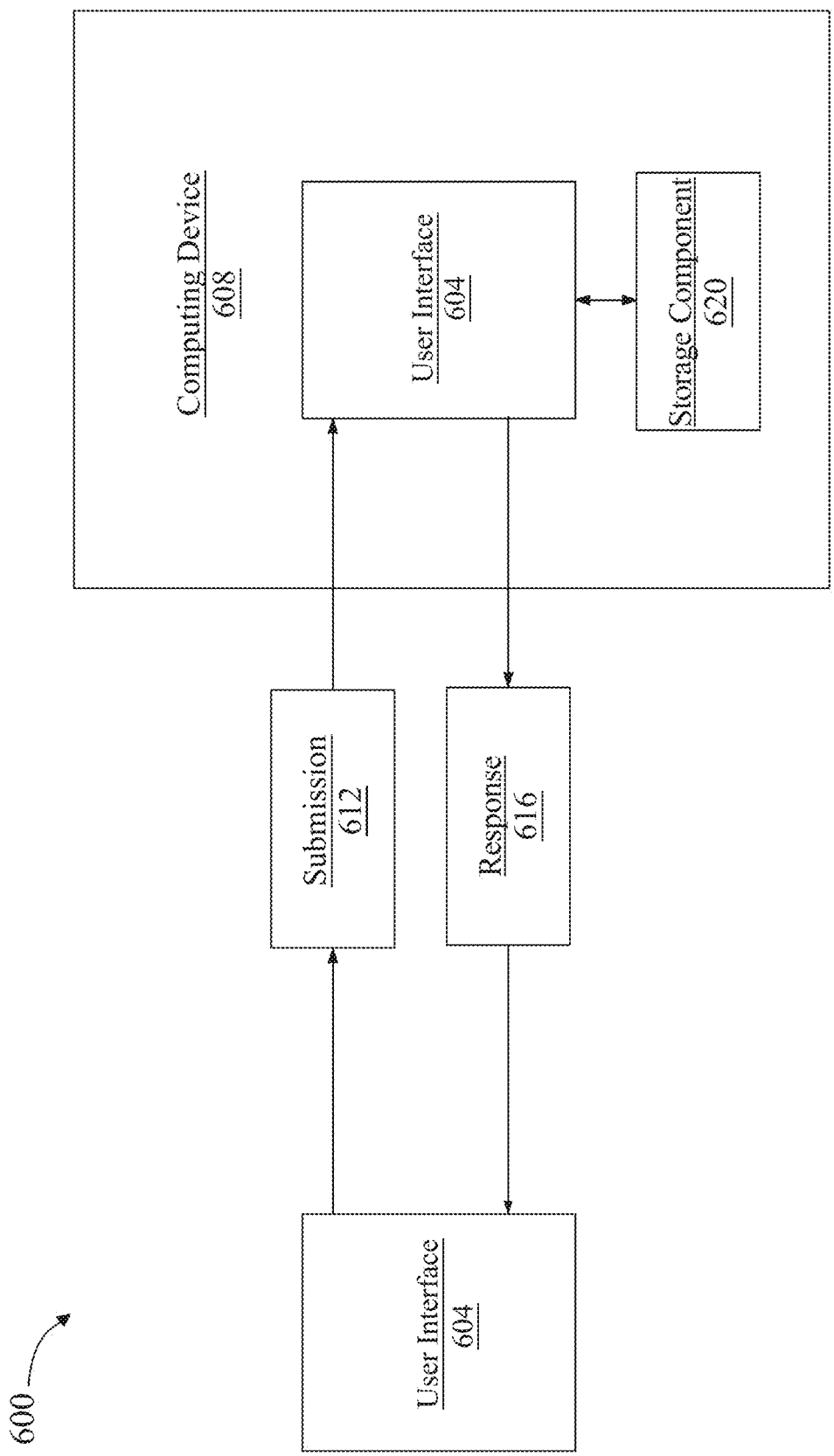
FIG. 6 illustrates an exemplary chatbot system.

Now referring to FIG. 6, in some embodiments, apparatus 600 may communicate with user and/or instructor using a chatbot. According to some embodiments, user interface 604 on user device may be communicative with a computing device 608 that is configured to operate a chatbot. In some embodiments, user interface 604 may be local to user device. In some embodiments, user interface 604 may be local to computing device 608. Alternatively, or additionally, in some cases, user interface 604 may remote to user device and communicative with user device, by way of one or more networks, such as without limitation the internet. Alternatively, or additionally, one or more user interfaces may communicate with computing device 608 using telephonic devices and networks, such as without limitation fax machines, short message service (SMS), or multimedia message service (MMS). Commonly, user communicate with computing device 608 using text-based communication, for example without limitation using a character encoding protocol, such as American Standard for Information Interchange (ASCII). Typically, user interfaces conversationally interface with a chatbot, by way of at least a submission, from a user interface to the chatbot, and a response, from the chatbot to the user interface. For example, user interface 604 may interface with a chatbot using submission 612 and response 616. In some embodiments, submission 612 and/or response 616 may use text-based communication. In some embodiments, submission 612 and/or response 616 may use audio communication.

Still referring to FIG. 6, submission 612, once received by computing device 608 operating a chatbot, may be processed by a computing device 608. In some embodiments, computing device 608 processes submission 612 using one or more of keyword recognition, pattern matching, and natural language processing. In some embodiments, processor employs real-time learning with evolutionary algorithms. In some cases, computing device 608 may retrieve a pre-prepared response from at least a storage component 620, based upon submission 612. Alternatively or additionally, in some embodiments, computing device 608 communicates a response 616 without first receiving a submission, thereby initiating conversation. In some cases, computing device 608 communicates an inquiry to user interface 604; and computing device 608 is configured to process an answer to the inquiry in a following submission from the user interface. In some cases, an answer to an inquiry present within a submission from a user device may be used by computing device 608 as an input to another function. In some embodiments, computing device 608 may include machine learning module. Machine learning module may include any machine learning models described herein. In some embodiments, submission 612 may be input into a trained machine learning model within machine learning module. In some embodiments, submission 612 may undergo one or more processing steps before being input into a machine learning model. In some embodiments, submission 612 may be used to train a machine learning model within machine learning module.

Figure 7:
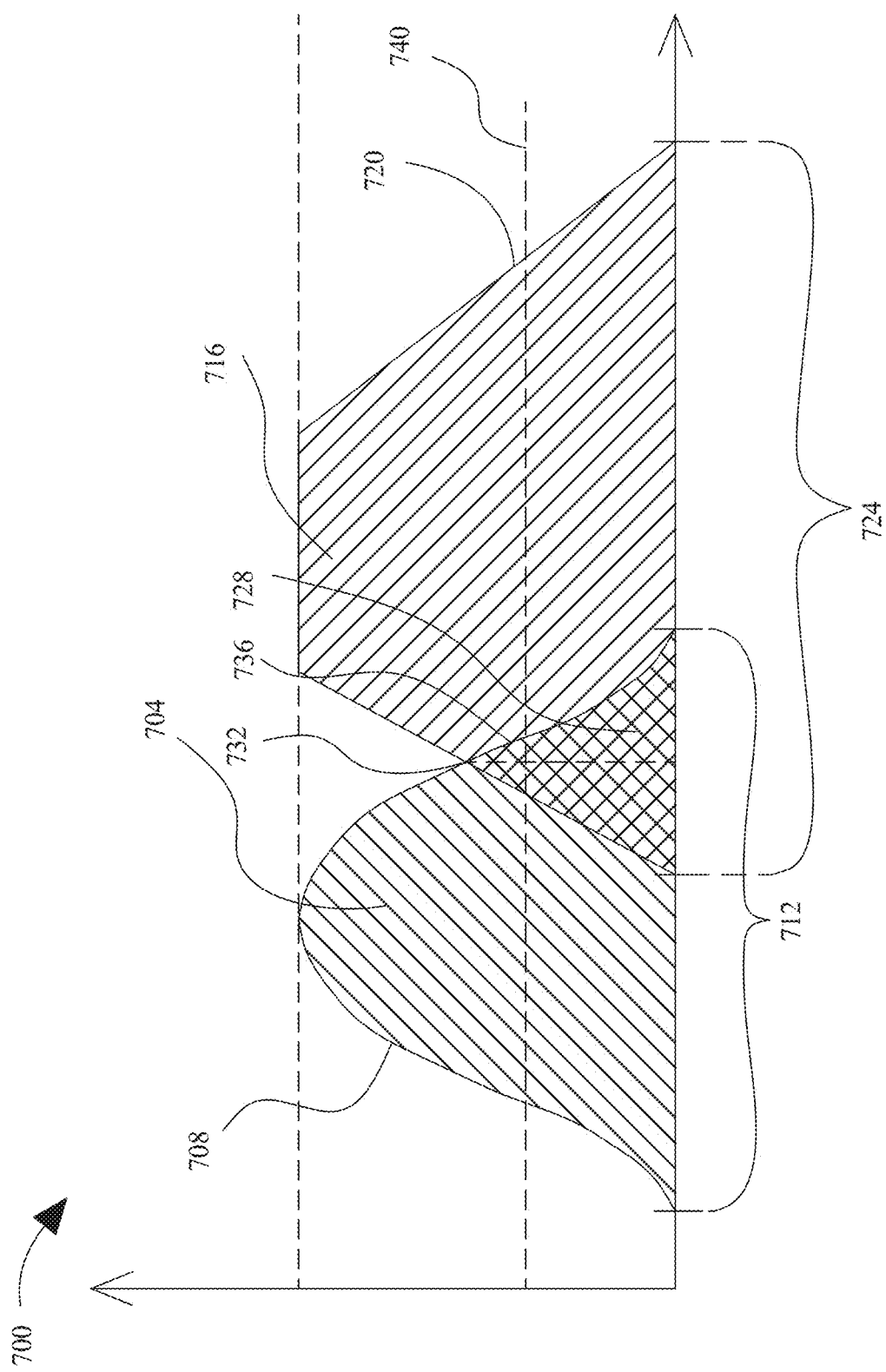
FIG. 7 illustrates an exemplary fuzzy set system.

Referring to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more machine-learning models, image data 130 or user input 136, and a predetermined class, such as without limitation of image data label or user input label. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models and/or image data 130 or user input 136 and a predetermined class, such as without limitation image data label or user input label categorization, for combination to occur as described above. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify an image data 130 or user input 136 with image data label or user input label. For instance, if an image data label or user input label has a fuzzy set matching image data 130 or user input 136 fuzzy set by having a degree of overlap exceeding a threshold, processor 102 may classify the image data 130 or user input 136 as belonging to the image data label or user input label categorization. Where multiple fuzzy matches are performed, degrees of match for each respective fuzzy set may be computed and aggregated through, for instance, addition, averaging, or the like, to determine an overall degree of match.

Still referring to FIG. 7, in an embodiment, an image data 130 or user input 136 may be compared to multiple image data label or user input label categorization fuzzy sets. For instance, image data 130 or user input 136 may be represented by a fuzzy set that is compared to each of the multiple image data label or user input label categorization fuzzy sets; and a degree of overlap exceeding a threshold between the image data 130 or user input 136 fuzzy set and any of the multiple image data label or user input label categorization fuzzy sets may cause processor 102 to classify the image data 130 or user input 136 as belonging to image data label or user input label categorization. For instance, in one embodiment there may be image data label and user input label categorization fuzzy sets, representing respectively image data label and user input label categorization. First image data label or user input label categorization may have a first fuzzy set; Second image data label or user input label categorization may have a second fuzzy set; and image data 130 or user input 136 may have an image data 130 or user input 136 fuzzy set. processor 102, for example, may compare an image data 130 or user input 136 fuzzy set with each of image data label or user input label categorization fuzzy set and in image data label or user input label categorization fuzzy set, as described above, and classify image data 130 or user input 136 to either, both, or neither of image data label or user input label categorization or in image data label or user input label categorization. Machine-learning methods as described throughout may, in a non-limiting example, generate coefficients used in fuzzy set equations as described above, such as without limitation x, c, and a of a Gaussian set as described above, as outputs of machine-learning methods. Likewise, image data 130 or user input 136 may be used indirectly to determine a fuzzy set, as image data 130 or user input 136 fuzzy set may be derived from outputs of one or more machine-learning models that take the image data 130 or user input 136 directly or indirectly as inputs.

Still referring to FIG. 7, a computing device may use a logic comparison program, such as, but not limited to, a fuzzy logic model to determine an image data label or user input label response. An image data label or user input label response may include, but is not limited to, positive, neutral, negative, good, bad, and the like; each such image data label or user input label response may be represented as a value for a linguistic variable representing image data label or user input label response or in other words a fuzzy set as described above that corresponds to a degree of sentiment as calculated using any statistical, machine-learning, or other method that may occur to a person skilled in the art upon reviewing the entirety of this disclosure. In other words, a given element of image data 130 or user input 136 may have a first non-zero value for membership in a first linguistic variable value such as "good" and a second non-zero value for membership in a second linguistic variable value such as "bad" In some embodiments, determining an image data label or user input label categorization may include using a linear regression model. A linear regression model may include a machine learning model. A linear regression model may be configured to map data of image data 130 or user input 136, such as degree of sentiment to one or more image data label or user input label parameters. A linear regression model may be trained using a machine learning process. A linear regression model may map statistics such as, but not limited to, quality of image data or user input sentiment. In some embodiments, determining an image data label or user input label of image data 130 or user input 136 may include using an image data label or user input label classification model. An image data label or user input label classification model may be configured to input collected data and cluster data to a centroid based on, but not limited to, frequency of appearance, linguistic indicators of quality, and the like. Centroids may include scores assigned to them such that quality of sentiment of image data 130 or user input 136 may each be assigned a score. In some embodiments image data label or user input label classification model may include a K-means clustering model. In some embodiments, image data label or user input label classification model may include a particle swarm optimization model. In some embodiments, determining the image data label or user input label of an image data 130 or user input 136 may include using a fuzzy inference engine. A fuzzy inference engine may be configured to map one or more image data or user input data elements using fuzzy logic. In some embodiments, image data 130 or user input 136 may be arranged by a logic comparison program into image data label or user input label arrangement. An "image data label or user input label arrangement" as used in this disclosure is any grouping of objects and/or data based on skill level and/or output score. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given sentiment level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 7, an inference engine may be implemented according to input and/or output membership functions and/or linguistic variables. For instance, a first linguistic variable may represent a first measurable value pertaining to image data 130 or user input 136, such as a degree of sentiment of an element, while a second membership function may indicate a degree of in image data label or user input label of a subject thereof, or another measurable value pertaining to image data 130 or user input 136. Continuing the example, an output linguistic variable may represent, without limitation, a score value. An inference engine may combine rules—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 7, image data 130 or user input 136 to be used may be selected by user selection, and/or by selection of a distribution of output scores, such as 70% good/positive, 40% neutral, and 70% bad/negative levels or the like. Each image data label or user input label categorization may be selected using an additional function such as in image data label or user input label as described above.

Figure 8:
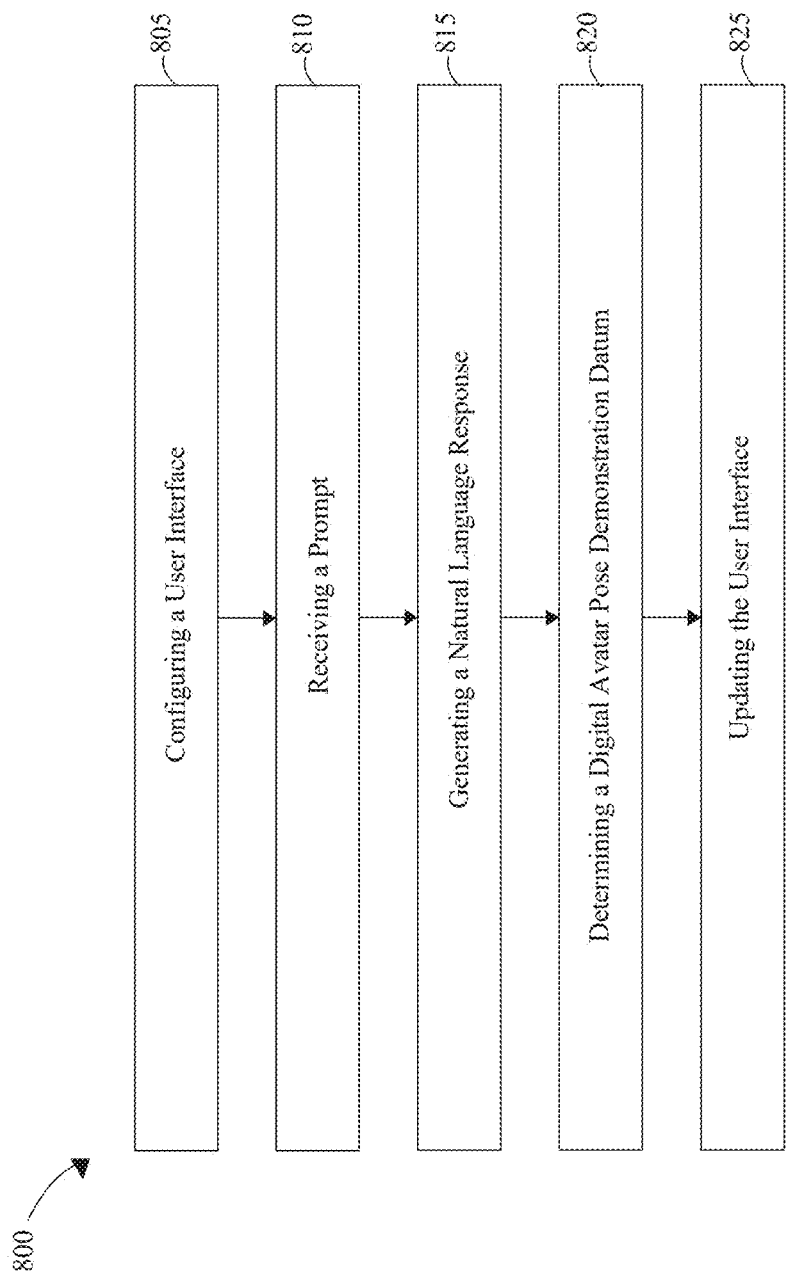
FIG. 8 illustrates a flow diagram depicting an exemplary embodiment of a method for an interactive course user interface including a digital avatar.

Referring now to FIG. 8, a flow diagram of an exemplary method 800 for an interactive course user interface including a digital avatar is illustrated. Method 800 contains a step 805 of configuring, using at least a processor, a user interface to display instructional content to a user using a display. This may be implemented as referenced to FIGS. 1-8.

Still referring to FIG. 8, method 800 contains a step 810 of receiving, using at least a processor, a prompt from a user using a user interface. This may be implemented as referenced to FIGS. 1-8.

Still referring to FIG. 8, method 800 contains a step 815 of generating, using at least a processor, a natural language response based on a prompt and an instructional content using a large language model (LLM). In some embodiments, generating the natural language response may include capturing image data of the user using a camera, generating a prompt supplement as a function of the image data using a machine vision system, generating a combined prompt based on the prompt, the instructional content, and the prompt supplement and generating the natural language response based on the combined prompt using the LLM. These may be implemented as referenced to FIGS. 1-8.

Still referring to FIG. 8, method 800 contains a step 820 of determining, using at least a processor, a digital avatar pose demonstration datum as a function of a natural language response and an instructional content, wherein the digital avatar pose demonstration datum includes a plurality of vertices of the digital avatar and key frame data, wherein the key frame data includes vertex position data. In some embodiments, determining the digital avatar pose demonstration datum may include generating pose demonstration training data, wherein the pose demonstration training data may include exemplary natural language responses correlated to exemplary digital avatar pose demonstration datums, training a pose demonstration machine-learning model using the pose demonstration training data and identifying the digital avatar pose demonstration datum as a function of the natural language response using the trained pose demonstration machine-learning model. In some embodiments, the pose demonstration machine-learning model may include a large behavior model. In some embodiments, determining the digital avatar pose demonstration datum may include appending the instructional content for the digital avatar pose demonstration datum using the LLM and generating a pose description of the digital avatar pose demonstration datum using the LLM. In some embodiments, determining the digital avatar pose demonstration datum may include receiving a pose selection request of a user input and generating the digital avatar pose demonstration datum as a function of the pose selection request. These may be implemented as referenced to FIGS. 1-8.

Still referring to FIG. 8, method 800 contains a step 825 of updating, using at least a processor, a user interface using a display, wherein updating the user interface includes generating a digital avatar display element configured to display a digital avatar pose demonstration datum to a user and communicating a natural language response to the user. In some embodiments, wherein updating the user interface may include determining an overlaid digital avatar pose demonstration datum as a function of the digital avatar pose demonstration datum and the image data and displaying the overlaid digital avatar pose demonstration datum on top of the digital avatar pose demonstration datum. In some embodiments, updating the user interface may include receiving a viewing perspective of a user input, generating the digital avatar pose demonstration datum as a function of the viewing perspective and updating the user interface in response to the digital avatar pose demonstration datum. In some embodiments, the user interface may include an instruction display element, wherein the instruction display element may be configured to display the natural language response to the user. In some embodiments, generating the digital avatar display element may include receiving a user input for the instruction display element and updating the digital avatar display element as a function of the user input. These may be implemented as referenced to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
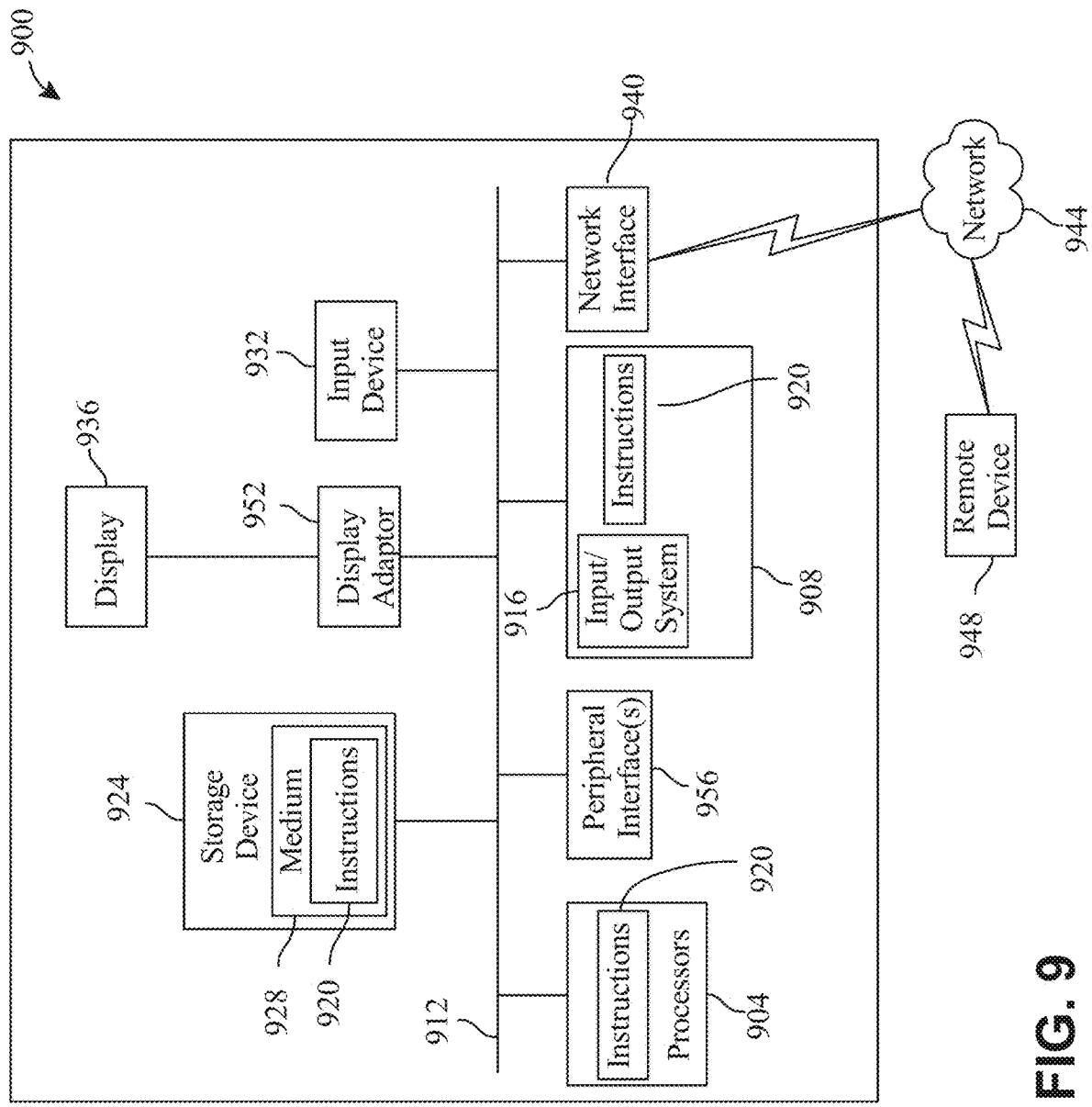
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display device 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for an interactive course user interface including a digital avatar, the apparatus comprising:
    at least a processor; and
    a memory communicatively connected to the at least a processor, wherein the memory contains instructions configuring the at least a processor to:
        using a display, configure a user interface to display instructional content to a user;
        using the user interface, receive a prompt from the user;
        using a large language model (LLM), generate a natural language response based on the prompt and the instructional content;
        determine a digital avatar pose demonstration datum including a demonstration of a physical technique for handling a patient as a function of the natural language response and the instructional content, wherein the digital avatar pose demonstration datum comprises a plurality of vertices of the digital avatar and key frame data, wherein the key frame data comprises vertex position data, and wherein determining the digital avatar pose demonstration datum comprises:
            appending the instructional content for the digital avatar pose demonstration datum using the LLM; and
            generating a pose description of the digital avatar pose demonstration datum using the LLM, wherein the pose description comprises an explanation of the pose's intended purpose; and
        using the display, update the user interface, wherein updating the user interface comprises:
            generating a digital avatar display element configured to display the digital avatar pose demonstration datum to the user; and
            communicating the natural language response to the user.

2. The apparatus of claim 1, wherein:
    the apparatus further comprises a camera; and
    the memory contains instructions configuring the at least a processor to:
        using the camera, capture image data of the user;
        using a machine vision system, generate a prompt supplement as a function of the image data; and
        generate the natural language response, comprising:
            generating a combined prompt based on the prompt, the instructional content, and the prompt supplement; and
            using the LLM, generating the natural language response based on the combined prompt.

3. The apparatus of claim 2, wherein updating the user interface comprises:

determining an overlaid digital avatar pose demonstration datum as a function of the digital avatar pose demonstration datum and the image data; and displaying the overlaid digital avatar pose demonstration datum on top of the digital avatar pose demonstration datum.

4. The apparatus of claim 1, wherein determining the digital avatar pose demonstration datum comprises:

generating pose demonstration training data, wherein the pose demonstration training data comprises exemplary natural language responses correlated to exemplary digital avatar pose demonstration datums;

training a pose demonstration machine-learning model using the pose demonstration training data; and identifying the digital avatar pose demonstration datum as a function of the natural language response using the trained pose demonstration machine-learning model.

5. The apparatus of claim 4, wherein the pose demonstration machine-learning model comprises a large behavior model.

6. The apparatus of claim 1, wherein updating the user interface comprises:

receiving a viewing perspective of a user input;

generating the digital avatar pose demonstration datum as a function of the viewing perspective; and updating the user interface in response to the digital avatar pose demonstration datum.

7. The apparatus of claim 1, wherein determining the digital avatar pose demonstration datum comprises:

receiving a pose selection request of a user input; and generating the digital avatar pose demonstration datum as a function of the pose selection request.

8. The apparatus of claim 1, wherein the user interface comprises an instruction display element, wherein the instruction display element is configured to display the natural language response to the user.

9. The apparatus of claim 8, wherein generating the digital avatar display element comprises:

receiving a user input for the instruction display element; and updating the digital avatar display element as a function of the user input.

10. A method for an interactive course user interface including a digital avatar, the method comprising:

configuring, using at least a processor, a user interface to display instructional content to a user using a display;

receiving, using the at least a processor, a prompt from the user using the user interface;

generating, using the at least a processor, a natural language response based on the prompt and the instructional content using a large language model (LLM);

determining, using the at least a processor, a digital avatar pose demonstration datum including a demonstration of a physical technique for handling a patient as a function of the natural language response and the instructional content, wherein the digital avatar pose demonstration datum comprises a plurality of vertices of the digital avatar and key frame data, wherein the key frame data comprises vertex position data, and wherein determining the digital avatar pose demonstration datum comprises:

appending the instructional content for the digital avatar pose demonstration datum using the LLM; and generating a pose description of the digital avatar pose demonstration datum using the LLM, wherein the pose description comprises an explanation of the pose's intended purpose; and updating, using the at least a processor, the user interface using the display, wherein updating the user interface comprises:

generating a digital avatar display element configured to display the digital avatar pose demonstration datum to the user; and communicating the natural language response to the user.

11. The method of claim 10, generating the natural language response comprises:

capturing image data of the user using a camera;

generating a prompt supplement as a function of the image data using a machine vision system;

generating a combined prompt based on the prompt, the instructional content, and the prompt supplement; and generating the natural language response based on the combined prompt using the LLM.

12. The method of claim 11, wherein updating the user interface comprises:

determining an overlaid digital avatar pose demonstration datum as a function of the digital avatar pose demonstration datum and the image data; and displaying the overlaid digital avatar pose demonstration datum on top of the digital avatar pose demonstration datum.

13. The method of claim 10, wherein determining the digital avatar pose demonstration datum comprises:

generating pose demonstration training data, wherein the pose demonstration training data comprises exemplary natural language responses correlated to exemplary digital avatar pose demonstration datums;

training a pose demonstration machine-learning model using the pose demonstration training data; and identifying the digital avatar pose demonstration datum as a function of the natural language response using the trained pose demonstration machine-learning model.

14. The method of claim 13, wherein the pose demonstration machine-learning model comprises a large behavior model.

15. The method of claim 10, wherein updating the user interface comprises:

receiving a viewing perspective of a user input;

generating the digital avatar pose demonstration datum as a function of the viewing perspective; and updating the user interface in response to the digital avatar pose demonstration datum.

16. The method of claim 10, wherein determining the digital avatar pose demonstration datum comprises:

receiving a pose selection request of a user input; and generating the digital avatar pose demonstration datum as a function of the pose selection request.

17. The method of claim 10, wherein the user interface comprises an instruction display element, wherein the instruction display element is configured to display the natural language response to the user.

18. The method of claim 17, wherein generating the digital avatar display element comprises:

receiving a user input for the instruction display element; and updating the digital avatar display element as a function of the user input.

* * * * *